United States Patent
Goel et al.

(10) Patent No.: US 11,652,751 B2
(45) Date of Patent: May 16, 2023

(54) MAINTENANCE OF DOWNLINK THROUGHPUT

(71) Applicant: AltioStar Networks, Inc., Tewksbury, MA (US)

(72) Inventors: Anupam Kumar Goel, Bangalore (IN); Pramod Kumar Singh, Uttar Pradesh (IN)

(73) Assignee: Altiostar Networks, Inc., Tewksbury, MA (US)

( * ) Notice: Subject to any disclaimer, the term of this patent is extended or adjusted under 35 U.S.C. 154(b) by 99 days.

(21) Appl. No.: 17/214,753

(22) Filed: Mar. 26, 2021

(65) Prior Publication Data

US 2021/0328937 A1 Oct. 21, 2021

Related U.S. Application Data

(63) Continuation of application No. 16/797,800, filed on Feb. 21, 2020, now Pat. No. 10,972,400, which is a continuation of application No. 14/926,668, filed on Oct. 29, 2015, now Pat. No. 10,601,721.

(51) Int. Cl.
| | |
|---|---|
| *H04L 47/283* | (2022.01) |
| *H04W 28/02* | (2009.01) |
| *H04L 43/0882* | (2022.01) |
| *H04L 41/0896* | (2022.01) |
| *H04L 47/27* | (2022.01) |
| *H04L 43/0864* | (2022.01) |

(52) U.S. Cl.
CPC ........ *H04L 47/283* (2013.01); *H04L 41/0896* (2013.01); *H04L 43/0882* (2013.01); *H04L 47/27* (2013.01); *H04L 43/0864* (2013.01); *H04W 28/02* (2013.01)

(58) Field of Classification Search
CPC ..... H04L 47/283; H04L 47/27; H04L 1/0896; H04W 28/02
USPC .......................................................... 370/235
See application file for complete search history.

(56) References Cited

U.S. PATENT DOCUMENTS

| | | | |
|---|---|---|---|
| 7,099,273 B2 * | 8/2006 | Ha | .......................... H04L 47/37 370/235 |
| 2007/0008884 A1 * | 1/2007 | Tang | ......................... H04L 9/40 370/230 |
| 2009/0201809 A1 | 8/2009 | Sommerville et al. | |
| 2013/0148503 A1 * | 6/2013 | Hutchison | ............... H04L 43/50 370/235 |
| 2013/0176848 A1 | 7/2013 | Jinzaki | |

(Continued)

*Primary Examiner* — Angel T Brockman
(74) *Attorney, Agent, or Firm* — Mintz Levin Cohn Ferris Glovsky and Popeo, P.C.

(57) ABSTRACT

A method, an apparatus, a computer-program product and a system for transmission of data packets are disclosed. A communication link between a first device and a second device is established in accordance with a transmission control protocol for transmission of a data packet between the first device and the second device. The communication link is monitored during transmission of the data packet from the second device to the first device. Based on the monitoring, at least a portion of a bandwidth available for transmission of an acknowledgement from the second device to the first device is adjusted. The acknowledgement indicates receipt of the data packet performing by the second device.

22 Claims, 17 Drawing Sheets

(56) References Cited

U.S. PATENT DOCUMENTS

2013/0201832 A1  8/2013  Kang et al.
2017/0126574 A1* 5/2017  Goel .................. H04L 43/0882

* cited by examiner

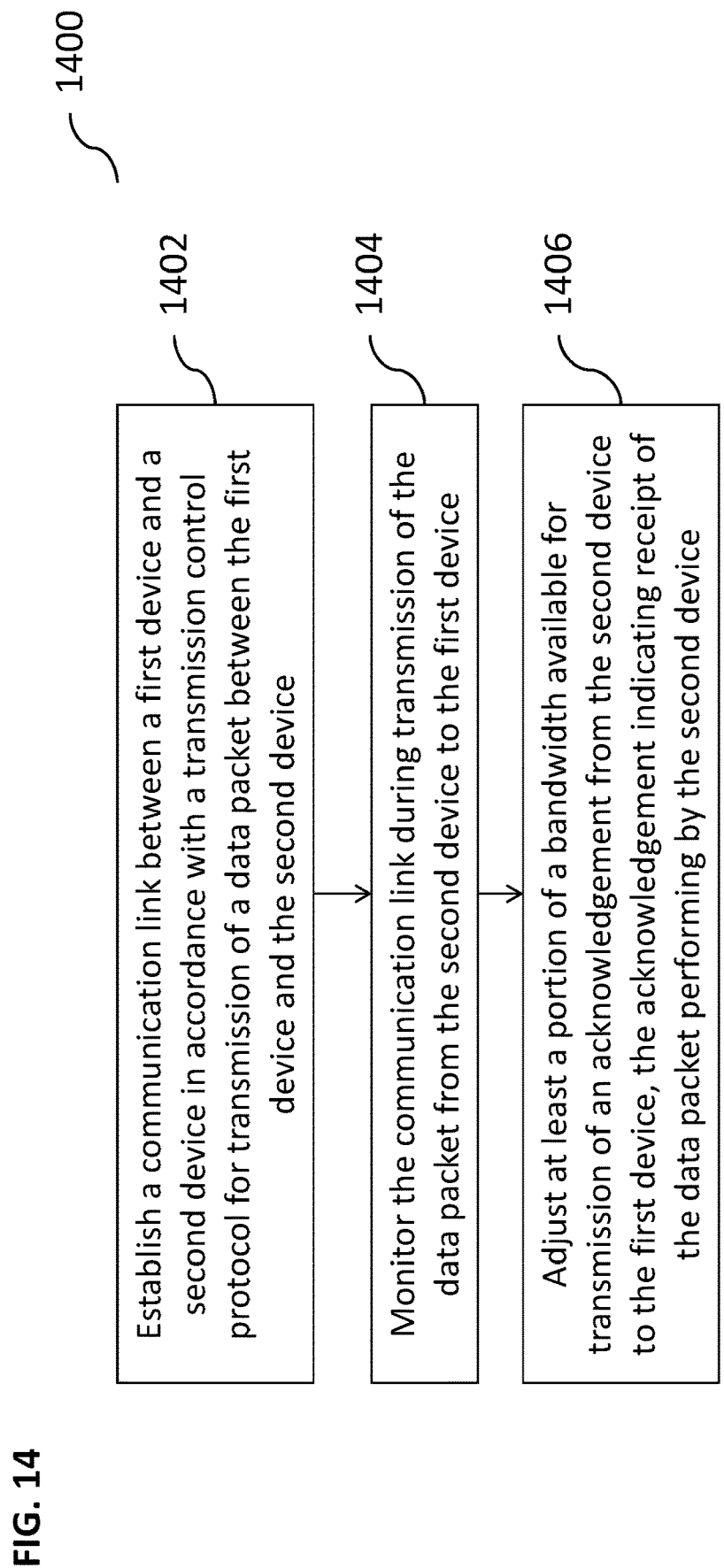

MAINTENANCE OF DOWNLINK THROUGHPUT

CROSS-REFERENCE TO RELATED APPLICATIONS

The present application is a continuation of and claims priority to U.S. patent application Ser. No. 16/797,800 to Anupam Kumar Goel, et al., filed Feb. 21, 2020, which is a continuation of and claims priority to U.S. patent application Ser. No. 14/926,668 to Anupam Kumar Goel, et al., filed on Oct. 29, 2015, now U.S. Pat. No. 10,601,721, issued on Mar. 24, 2020, and entitled "Maintenance Of Downlink Throughput", and incorporates their disclosures herein by reference in their entirety.

TECHNICAL FIELD

The subject matter described herein generally relates to data processing and in particular, to transmission control protocol receive window dynamic adaptation in uplink direction to maintain downlink throughput in a long term evolution radio access network.

BACKGROUND

In today's world, cellular networks provide on-demand communications capabilities to individuals and business entities. Typically, a cellular network is wireless network that can be distributed over land areas, which are called cells. Each such cell is served by at least one fixed-location transceiver, which is referred to as a cell site or a base station. Each cell can use a different set of frequencies than its neighbor cells in order to avoid interference and provide guaranteed bandwidth within each cell. When cells are joined together, they provide radio coverage over a wide geographic area, which enables a large number of mobile telephones, and/or other wireless devices or portable transceivers to communicate with each other and with fixed transceivers and telephones anywhere in the network. Such communications are performed through base stations and are accomplished even if when mobile transceivers are moving through more than one cell during transmission. Major wireless communications providers have deployed such cell sites throughout the world, thereby allowing communications mobile phones and mobile computing devices to be connected to the public switched telephone network and public Internet.

A mobile telephone is a portable telephone that is capable of receiving and/or making telephone and/or data calls through a cell site or a transmitting tower by using radio waves to transfer signals to and from the mobile telephone. In view of a large number of mobile telephone users, current mobile telephone networks provide a limited and shared resource. In that regard, cell sites and handsets can change frequency and use low power transmitters to allow simultaneous usage of the networks by many callers with less interference. Coverage by a cell site can depend on a particular geographical location and/or a number of users that can potentially use the network. For example, in a city, a cell site can have a range of up to approximately ½ mile; in rural areas, the range can be as much as 5 miles; and in some areas, a user can receive signals from a cell site 25 miles away.

The following are examples of some of the digital cellular technologies that are in use by the communications providers: Global System for Mobile Communications ("GSM"), General Packet Radio Service ("GPRS"), cdmaOne, CDMA2000, Evolution-Data Optimized ("EV-DO"), Enhanced Data Rates for GSM Evolution ("EDGE"), Universal Mobile Telecommunications System ("UMTS"), Digital Enhanced Cordless Telecommunications ("DECT"), Digital AMPS ("IS-136/TDMA"), and Integrated Digital Enhanced Network ("iDEN"). The Long Term Evolution, or 4G LTE, which was developed by the Third Generation Partnership Project ("3GPP") standards body, is a standard for a wireless communication of high-speed data for mobile phones and data terminals. LTE is based on the GSM/EDGE and UMTS/HSPA digital cellular technologies and allows for increasing capacity and speed by using a different radio interface together with core network improvements.

Communications links typically connect endpoint devices (e.g., mobile telephones, personal computers, servers, etc.) so that devices can transmit data to one another. Data transmissions are typically governed by various protocols that are specified in the Internet protocol suite, which includes the networking model and a set of communications protocols used for the Internet and/or similar networks. The Internet protocol suite is typically referred to as TCP/IP and contains its most important protocols: the Transmission Control Protocol ("TCP") and the Internet Protocol ("IP"). The TCP/IP model and protocols are maintained by the Internet Engineering Task Force ("IETF"). TCP/IP provides end-to-end connectivity specifying how data should be formatted, addressed, transmitted, routed and received at the destination endpoint device. TCP/IP protocols are organized into the following four abstraction layers (from lowest to highest): the link layer (containing communication technologies for a single network segment (link)), the internet layer (connecting independent networks to establish internetworking), the transport layer (handling process-to-process communication), and the application layer (providing interfaces to the user and support services).

Transmissions of data in a wireless communication system using TCP are typically affected by the delays, drops, and interruptions that can be result of congestion and/or retransmissions of data packets. These can occur in view of lack of available bandwidth that can be used for transmission of data packets on the downlink as well as data and acknowledgements on the uplink. Thus, the users can experience poor connectivity, data loss, congestion, redundant transmissions, battery power loss (e.g., in user equipment), and other problems. Thus, there is a need to provide a wireless communication system that is capable of providing an efficient, cost-effective and reliable transmission of video data between endpoint devices using TCP while maintaining downlink throughput at substantially constant level.

SUMMARY

In some implementations, the current subject matter relates to a computer-implemented method for transmission of data packets. The method can include establishing a communication link between a first device and a second device in accordance with a transmission control protocol for transmission of a data packet between the first device and the second device, monitoring the communication link during transmission of the data packet from the second device to the first device, and adjusting, based on the monitoring, at least a portion of a bandwidth available for transmission of an acknowledgement from the second device to the first device, the acknowledgement indicating receipt of the data packet performing by the second device. At least one of the establishing, the monitoring, and the adjusting can be performed using at least one processor of at least one computing system.

In some implementations, the current subject matter can include one or more of the following optional features. An evolved node (eNodeB) base station can perform at least one of the establishing, the monitoring and the adjusting, the eNodeB base station comprising the at least one processor and the at least one memory.

In some implementations, adjusting can include maintaining a predetermined amount of bandwidth for transmission of data packets from the first device to the second device. The adjusting can also include performing adjusting while maintaining the predetermining amount of bandwidth for transmission of data packets from the first device to the second device.

In some implementations, a bandwidth for transmission of data from the second device to the first device can include the portion and at least another portion. Another portion of the bandwidth can be available for transmission of data other than the acknowledgement from the second device to the first device. The adjusting can further include adjusting another portion of the bandwidth.

In some implementations, adjusting can be performed based on at least one condition associated with a communication link communicatively coupling the first device and the second device. The condition can include a round trip time information for the data packet, the round trip time information includes time taken by a transmission of the data packet to the first device and a transmission of an acknowledgement by the first device indicative of the receipt of the data packet at the TCP layer.

In some implementations, the acknowledgement from the second device to the first device indicating that the packet was received by the second device can be generated based on a layer 2 acknowledgement received from the second device by the at least one processor. In some implementations, the second device can transmit to the first device an acknowledgement indicating a receipt of the data packet by the second device upon receiving a confirmation that the data packet was received by the second device, the confirmation being generated by at least one of the following: a media access control (MAC) layer of the eNodeB, a packet data convergence protocol (PDCP) layer of the eNodeB, and a radio link control (RLC) layer.

In some implementations, the processor can be configured to schedule transmission of the data packet from the first device to the second device using the transmission control protocol.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 1b illustrates further detail of the exemplary LTE system shown in FIG. 1a;

FIG. 1c illustrates additional detail of the evolved packet core of the exemplary LTE system shown in FIG. 1a;

FIG. 1d illustrates an exemplary evolved Node B of the exemplary LTE system shown in FIG. 1a;

FIG. 14 illustrates an exemplary method, according to some implementations of the current subject matter.

DETAILED DESCRIPTION

Figure 1A:
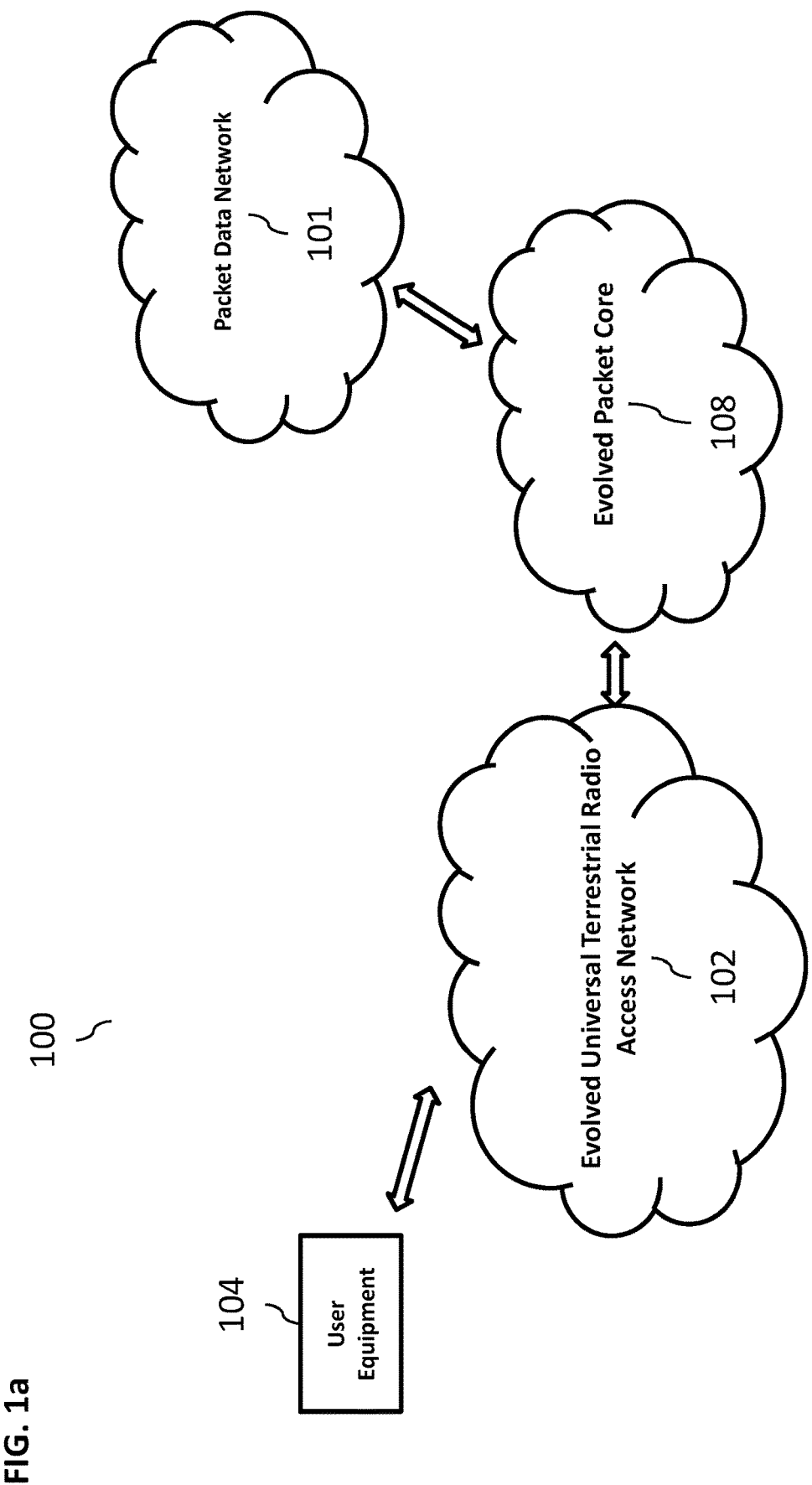
FIG. 1a illustrates an exemplary conventional long term evolution ("LTE") communications system.

To address the deficiencies of currently available solutions, one or more implementations of the current subject matter provide a long term evolution radio access network having intelligent capabilities, including transmission of data using TCP (such as between a server and a user equipment) as well as dynamic adaptation of a TCP receive window in an uplink direction to maintain downlink throughput.

In case of asymmetric networks (i.e., networks where bandwidth available in one direction can be greater than bandwidth available in another direction (e.g., in some LTE-FDD, peak throughput on the downlink can be 150 Mbps, whereas on the uplink—50 Mbps; in some LTE-TDD, peak throughput on the downlink can be 110 Mbps, whereas on the uplink—12 Mbps)). As such, acknowledgements ("ACKs") of downlink data packet flows, which are indicative of whether or not a data packet sent by a server was received by an intended recipient (e.g., mobile terminal), do not have adequate bandwidth on an uplink for transmission back to the server. This can affect downlink throughput, cause substantial delays, congestion, and exponentially increase round-trip-time ("RTT") associated with a communication link, thereby ruining user experience and increasing costs.

In some implementations, the current subject matter can resolve the above problems through a dynamic adaptation of a TCP receive window in an uplink direction, as discussed below. This has an advantage of maintaining downlink throughput, avoiding congestion, reducing RTT, decreasing number of retransmission of data packets, as well as other benefits. The current subject matter's exemplary dynamic adaption reduces an impact on ACKs of downlink data packet flows. For example, for 70 Mbps downlink data packet flow, the ACK bandwidth requirement in the uplink direction can be 2 Mbps. If 8 Mbps is available bandwidth in uplink direction, then only 6 Mbps of the throughput can be utilized (i.e., 8 Mbps total uplink bandwidth minus 2 Mbps for downlink ACKs). To reduce an impact on the uplink ACK flows, the current subject matter can perform an analysis and calculation (on periodic, automatic, constant, etc. basis) of the bandwidth for the uplink ACKs and the bandwidth associated with uplink flows. Moreover, the current subject matter can further perform determination of an adaptive TCP receive window size to reduce an impact on ACK flows.

In some implementations, the current subject matter relates to transmission of data packets in a wireless network. A communication link can be established between a first device (e.g., a server) and a second device (e.g., a mobile device) in accordance with a transmission control protocol for transmission of data packets between the two devices. The link can be monitored for transmission of data packets to the second device as well as acknowledgements generated and sent by the second device to the first device. A base station (e.g., an eNodeB base station) disposed between the first and second devices, can perform monitoring of the transmission of data packets between as well as acknowledgements. Based on the monitoring, the current subject matter can determine an amount of bandwidth on a link connecting the second device to the first device for sending acknowledgements as well as an amount of bandwidth for sending other data. The amount can vary based on one or more factors as discussed below. In some implementations, the current subject matter can be implemented in a wireless communication system, as such a long term evolution system, where some of its components are discussed below.

FIGS. 1a-c and 2 illustrate an exemplary conventional long term evolution ("LTE") communication system 100 along with its various components. An LTE system or a 4G LTE, as it commercially known, is governed by a standard for wireless communication of high-speed data for mobile telephones and data terminals. The standard is based on the GSM/EDGE ("Global System for Mobile Communications"/"Enhanced Data rates for GSM Evolution") as well as UMTS/HSPA ("Universal Mobile Telecommunications System"/"High Speed Packet Access") network technologies. The standard is developed by the 3GPP ("3rd Generation Partnership Project").

Figure 1B:
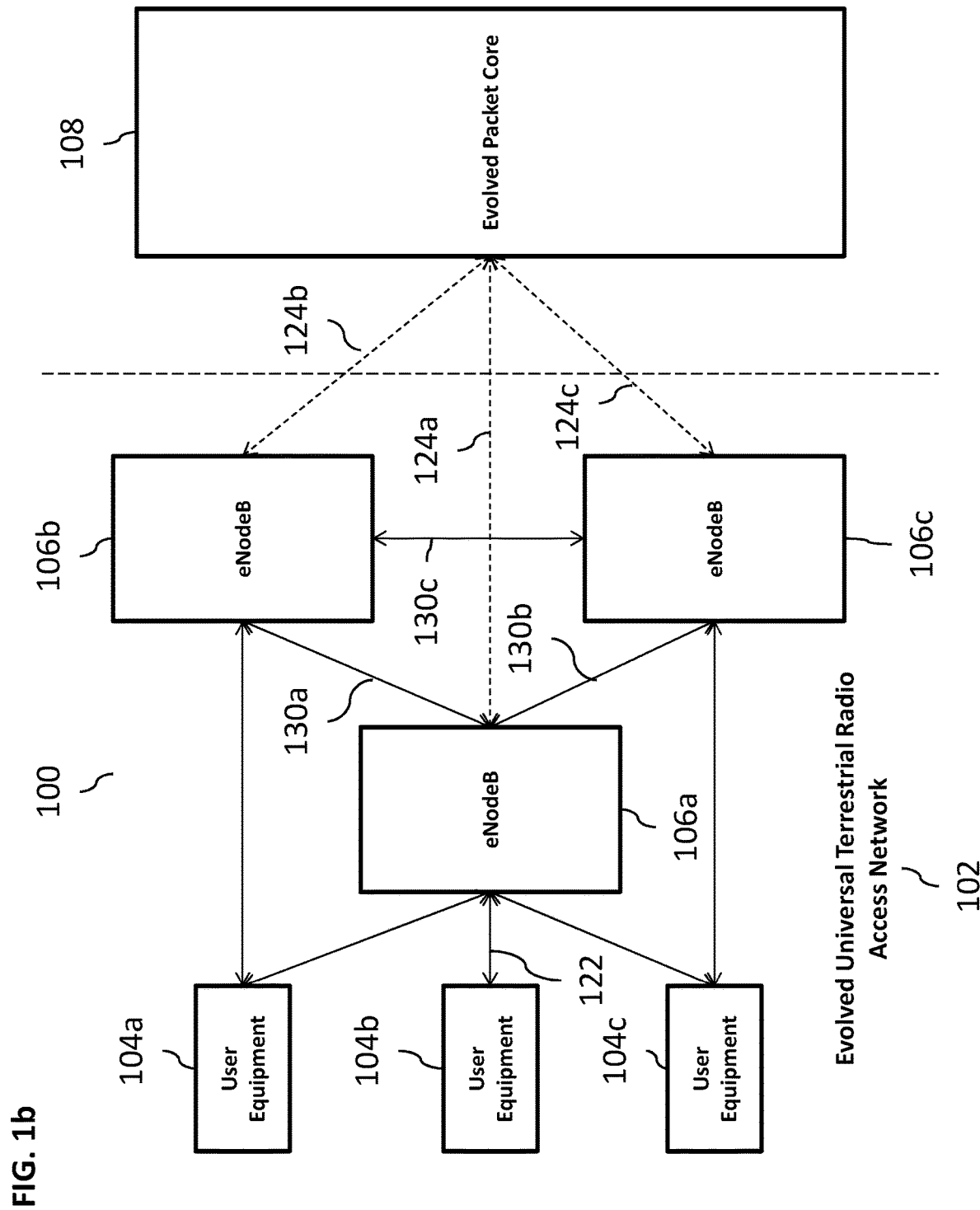

As shown in FIG. 1a, the system 100 can include an evolved universal terrestrial radio access network ("EU-TRAN") 102, an evolved packet core ("EPC") 108, and a packet data network ("PDN") 101, where the EUTRAN 102 and EPC 108 provide communication between a user equipment 104 and the PDN 101. The EUTRAN 102 can include a plurality of evolved node B's ("eNodeB" or "ENODEB" or "enodeb" or "eNB") or base stations 106 (a, b, c) (as shown in FIG. 1b) that provide communication capabilities to a plurality of user equipment 104(a, b, c). The user equipment 104 can be a mobile telephone, a smartphone, a table, a personal computer, a personal digital assistant ("PDA"), a server, a data terminal, and/or any other type of user equipment, and/or any combination thereof. The user equipment 104 can connect to the EPC 108 and eventually, the PDN 101, via any eNodeB 106. Typically, the user equipment 104 can connect to the nearest, in terms of distance, eNodeB 106. In the LTE system 100, the EUTRAN 102 and EPC 108 work together to provide connectivity, mobility and services for the user equipment 104.

Figure 1C:
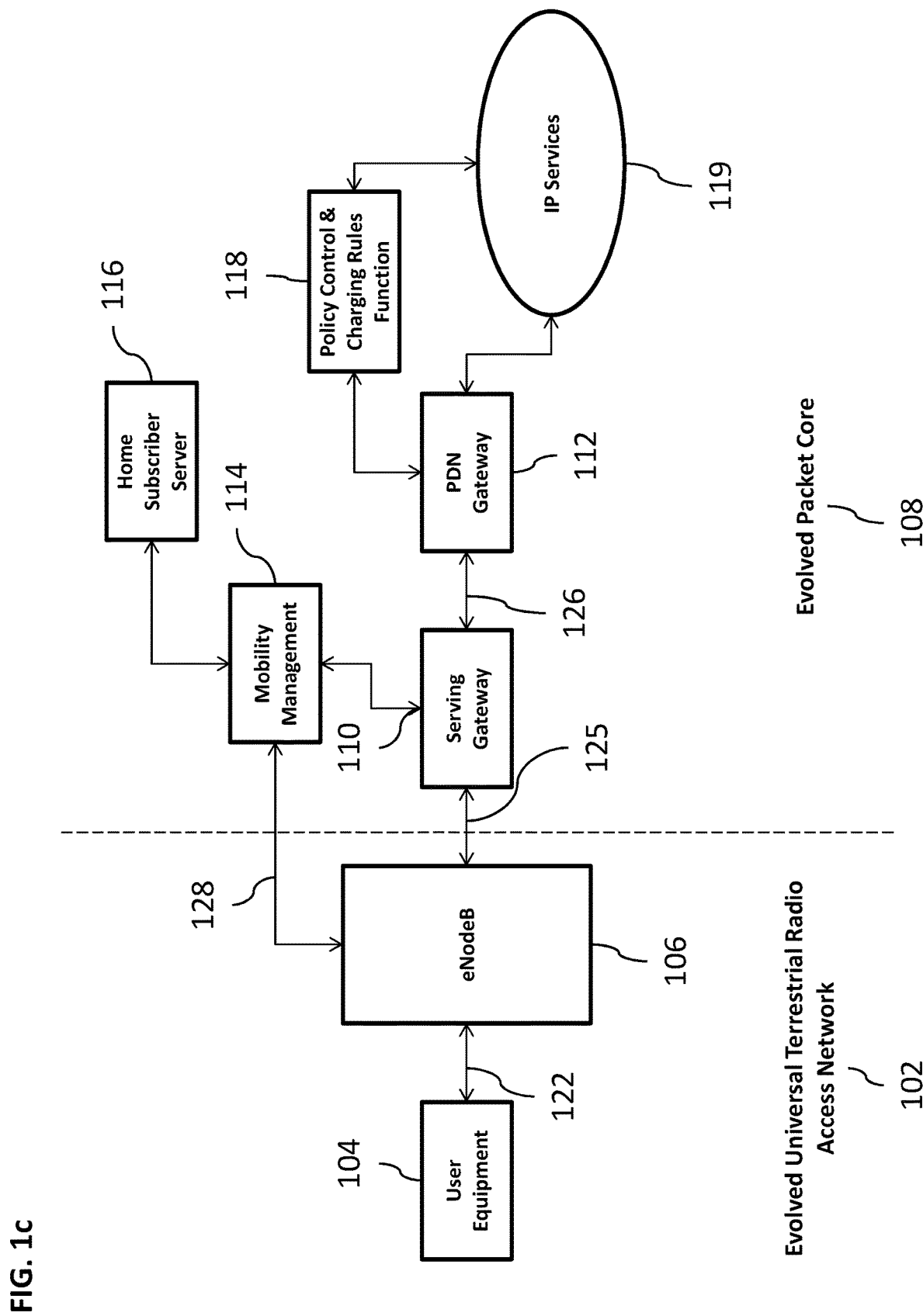

FIG. 1b illustrates further detail of the network 100 shown in FIG. 1a. As stated above, the EUTRAN 102 includes a plurality of eNodeBs 106, also known as cell sites. The eNodeBs 106 provides radio functions and performs key control functions including scheduling of air link resources or radio resource management, active mode mobility or handover, and admission control for services. The eNodeBs 106 are responsible for selecting which mobility management entities (MMES, as shown in FIG. 1c) will serve the user equipment 104 and for protocol features like header compression and encryption. The eNodeBs 106 that make up an EUTRAN 102 collaborate with one another for radio resource management and handover.

Communication between the user equipment 104 and the eNodeB 106 occurs via an air interface 122 (also known as "LTE-Uu" interface). As shown in FIG. 1b, the air interface 122 provides communication between user equipment 104b and the eNodeB 106a. The air interface 122 uses Orthogonal Frequency Division Multiple Access ("OFDMA") and Single Carrier Frequency Division Multiple Access ("SC-FDMA"), an OFDMA variant, on the downlink and uplink respectively. OFDMA allows use of multiple known antenna techniques, such as, Multiple Input Multiple Output ("MIMO").

The air interface 122 uses various protocols, which include a radio resource control ("RRC") for signaling between the user equipment 104 and eNodeB 106 and non-access stratum ("NAS") for signaling between the user equipment 104 and MME (as shown in FIG. 1c). In addition to signaling, user traffic is transferred between the user equipment 104 and eNodeB 106. Both signaling and traffic in the system 100 are carried by physical layer ("PHY") channels.

Multiple eNodeBs 106 can be interconnected with one another using an X2 interface 130(a, b, c). As shown in FIG. 1a, X2 interface 130a provides interconnection between eNodeB 106a and eNodeB 106b; X2 interface 130b provides interconnection between eNodeB 106a and eNodeB

106c; and X2 interface 130c provides interconnection between eNodeB 106b and eNodeB 106c. The X2 interface can be established between two eNodeBs in order to provide an exchange of signals, which can include a load- or interference-related information as well as handover-related information. The eNodeBs 106 communicate with the evolved packet core 108 via an S1 interface 124(a, b, c). The S1 interface 124 can be split into two interfaces: one for the control plane (shown as control plane interface (S1-MME interface) 128 in FIG. 1c) and the other for the user plane (shown as user plane interface (S1-U interface) 125 in FIG. 1c).

The EPC 108 establishes and enforces Quality of Service ("QoS") for user services and allows user equipment 104 to maintain a consistent internet protocol ("IP") address while moving. It should be noted that each node in the network 100 has its own IP address. The EPC 108 is designed to interwork with legacy wireless networks. The EPC 108 is also designed to separate control plane (i.e., signaling) and user plane (i.e., traffic) in the core network architecture, which allows more flexibility in implementation, and independent scalability of the control and user data functions.

The EPC 108 architecture is dedicated to packet data and is shown in more detail in FIG. 1c. The EPC 108 includes a serving gateway (S-GW) 110, a PDN gateway (P-GW) 112, a mobility management entity ("MME") 114, a home subscriber server ("HSS") 116 (a subscriber database for the EPC 108), and a policy control and charging rules function ("PCRF") 118. Some of these (such as S-GW, P-GW, MME, and HSS) are often combined into nodes according to the manufacturer's implementation.

The S-GW 110 functions as an IP packet data router and is the user equipment's bearer path anchor in the EPC 108. Thus, as the user equipment moves from one eNodeB 106 to another during mobility operations, the S-GW 110 remains the same and the bearer path towards the EUTRAN 102 is switched to talk to the new eNodeB 106 serving the user equipment 104. If the user equipment 104 moves to the domain of another S-GW 110, the MME 114 will transfer all of the user equipment's bearer paths to the new S-GW. The S-GW 110 establishes bearer paths for the user equipment to one or more P-GWs 112. If downstream data are received for an idle user equipment, the S-GW 110 buffers the downstream packets and requests the MME 114 to locate and reestablish the bearer paths to and through the EUTRAN 102.

The P-GW 112 is the gateway between the EPC 108 (and the user equipment 104 and the EUTRAN 102) and PDN 101 (shown in FIG. 1a). The P-GW 112 functions as a router for user traffic as well as performs functions on behalf of the user equipment. These include IP address allocation for the user equipment, packet filtering of downstream user traffic to ensure it is placed on the appropriate bearer path, enforcement of downstream QoS, including data rate. Depending upon the services a subscriber is using, there may be multiple user data bearer paths between the user equipment 104 and P-GW 112. The subscriber can use services on PDNs served by different P-GWs, in which case the user equipment has at least one bearer path established to each P-GW 112. During handover of the user equipment from one eNodeB to another, if the S-GW 110 is also changing, the bearer path from the P-GW 112 is switched to the new S-GW.

The MME 114 manages user equipment 104 within the EPC 108, including managing subscriber authentication, maintaining a context for authenticated user equipment 104, establishing data bearer paths in the network for user traffic, and keeping track of the location of idle mobiles that have not detached from the network. For idle user equipment 104 that needs to be reconnected to the access network to receive downstream data, the MME 114 initiates paging to locate the user equipment and re-establishes the bearer paths to and through the EUTRAN 102. MME 114 for a particular user equipment 104 is selected by the eNodeB 106 from which the user equipment 104 initiates system access. The MME is typically part of a collection of MMEs in the EPC 108 for the purposes of load sharing and redundancy. In the establishment of the user's data bearer paths, the MME 114 is responsible for selecting the P-GW 112 and the S-GW 110, which will make up the ends of the data path through the EPC 108.

The PCRF 118 is responsible for policy control decision-making, as well as for controlling the flow-based charging functionalities in the policy control enforcement function ("PCEF"), which resides in the P-GW 110. The PCRF 118 provides the QoS authorization (QoS class identifier ("QCI") and bit rates) that decides how a certain data flow will be treated in the PCEF and ensures that this is in accordance with the user's subscription profile.

As stated above, the IP services 119 are provided by the PDN 101 (as shown in FIG. 1a).

Figure 1D:
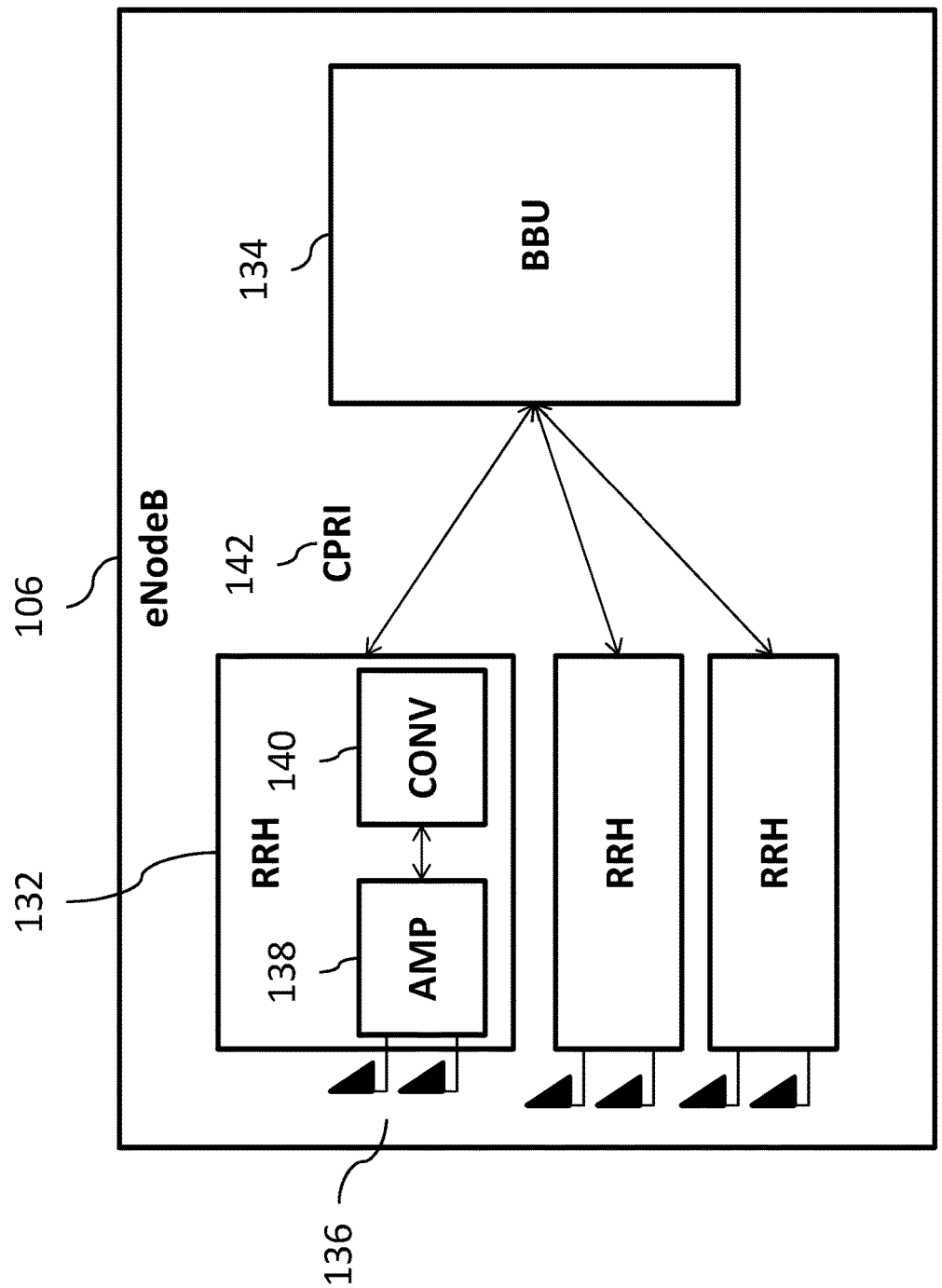

FIG. 1d illustrates an exemplary structure of eNodeB 106. The eNodeB 106 can include at least one remote radio head ("RRH") 132 (typically, there can be three RRH 132) and a baseband unit ("BBU") 134. The RRH 132 can be connected to antennas 136. The RRH 132 and the BBU 134 can be connected using an optical interface that is compliant with common public radio interface ("CPRI") 142 standard specification. The operation of the eNodeB 106 can be characterized using the following standard parameters (and specifications): radio frequency band (Band4, Band9, Band17), bandwidth (5, 10, 15, 20 MHz), access scheme (downlink: OFDMA; uplink: SC-OFDMA), antenna technology (downlink: 2×2 MIMO; uplink: 1×2 single input multiple output ("SIMO")), number of sectors (6 maximum), maximum transmission power (60 W), maximum transmission rate (downlink: 150 Mb/s; uplink: 50 Mb/s), S1/X2 interface (1000Base-SX, 1000Base-T), and mobile environment (up to 350 km/h). The BBU 134 can be responsible for digital baseband signal processing, termination of S1 line, termination of X2 line, call processing and monitoring control processing. IP packets that are received from the EPC 108 (not shown in FIG. 1d) can be modulated into digital baseband signals and transmitted to the RRH 132. Conversely, the digital baseband signals received from the RRH 132 can be demodulated into IP packets for transmission to EPC 108.

The RRH 132 can transmit and receive wireless signals using antennas 136. The RRH 132 can convert (using converter ("CONV") 140) digital baseband signals from the BBU 134 into radio frequency ("RF") signals and power amplify (using amplifier ("AMP") 138) them for transmission to user equipment 104 (not shown in FIG. 1d). Conversely, the RF signals that are received from user equipment 104 are amplified (using AMP 138) and converted (using CONV 140) to digital baseband signals for transmission to the BBU 134.

Figure 2:
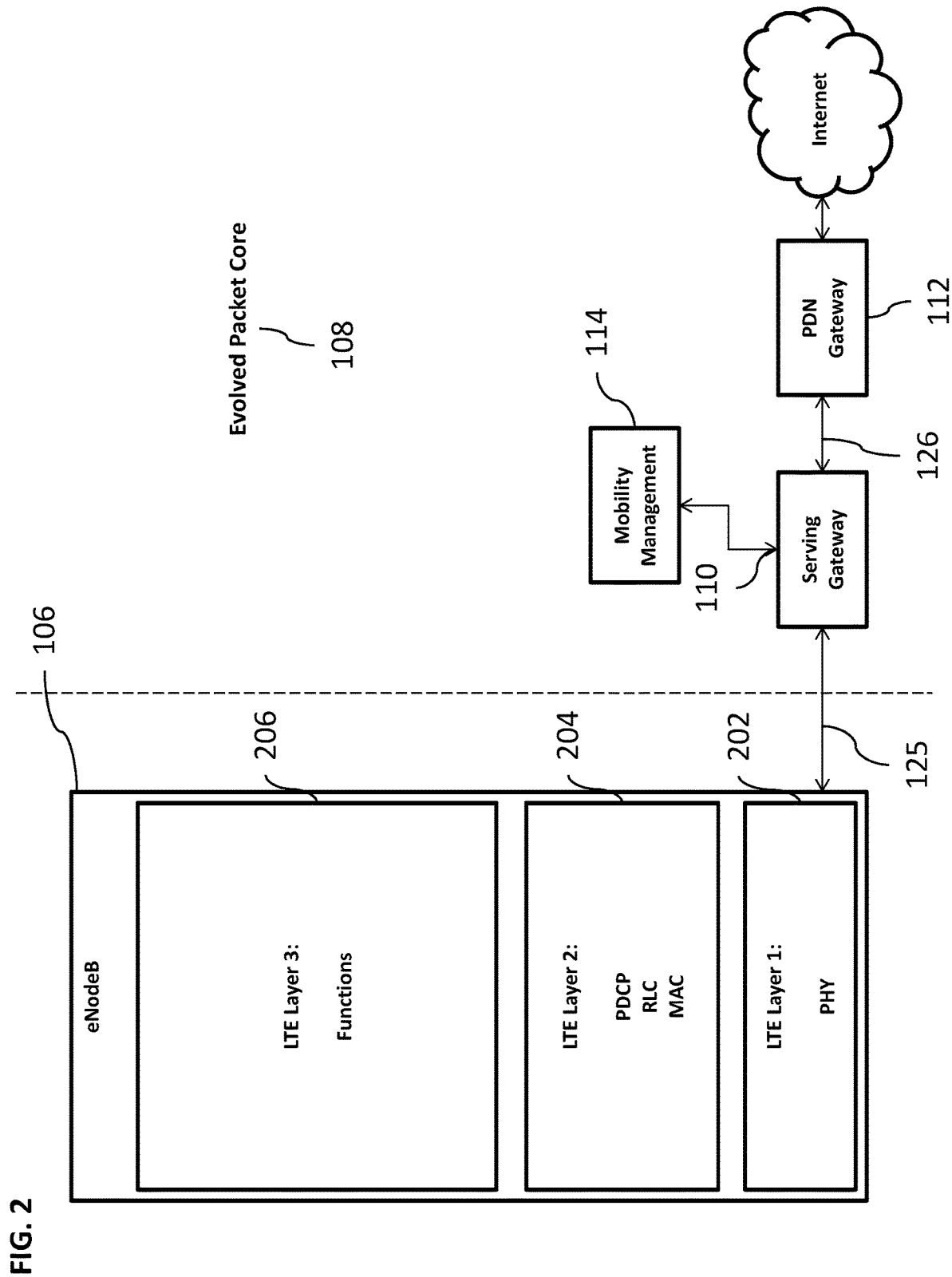
FIG. 2 illustrates further detail of an evolved Node B shown in FIGS. 1a-d.

FIG. 2 illustrates an additional detail of an exemplary eNodeB 106. The eNodeB 106 includes a plurality of layers: LTE layer 1 202, LTE layer 2 204, and LTE layer 3 206. The LTE layer 1 incudes a physical layer ("PHY"). The LTE layer 2 includes a medium access control ("MAC"), a radio link control ("RLC"), a packet data convergence protocol ("PDCP"). The LTE layer 3 includes various functions and protocols, including a radio resource control ("RRC"), a dynamic resource allocation, eNodeB measurement configuration and provision, a radio admission control, a connection mobility control, and radio resource management ("RRM"). The RLC protocol is an automatic repeat request ("ARQ") fragmentation protocol used over a cellular air interface. The RRC protocol handles control plane signaling of LTE layer 3 between the user equipment and the EUTRAN. RRC includes functions for connection establishment and release, broadcast of system information, radio bearer establishment/reconfiguration and release, RRC connection mobility procedures, paging notification and release, and outer loop power control. The PDCP performs IP header compression and decompression, transfer of user data and maintenance of sequence numbers for Radio Bearers. The BBU 134, shown in FIG. 1*d*, can include LTE layers L1-L3.

One of the primary functions of the eNodeB 106 is radio resource management, which includes scheduling of both uplink and downlink air interface resources for user equipment 104, control of bearer resources, and admission control. The eNodeB 106, as an agent for the EPC 108, is responsible for the transfer of paging messages that are used to locate mobiles when they are idle. The eNodeB 106 also communicates common control channel information over the air, header compression, encryption and decryption of the user data sent over the air, and establishing handover reporting and triggering criteria. As stated above, the eNodeB 106 can collaborate with other eNodeB 106 over the X2 interface for the purposes of handover and interference management. The eNodeBs 106 communicate with the EPC's MME via the S1-MME interface and to the S-GW with the S1-U interface. Further, the eNodeB 106 exchanges user data with the S-GW over the S1-U interface. The eNodeB 106 and the EPC 108 have a many-to-many relationship to support load sharing and redundancy among MMES and S-GWs. The eNodeB 106 selects an MME from a group of MMES so the load can be shared by multiple MMES to avoid congestion.

Figure 3:
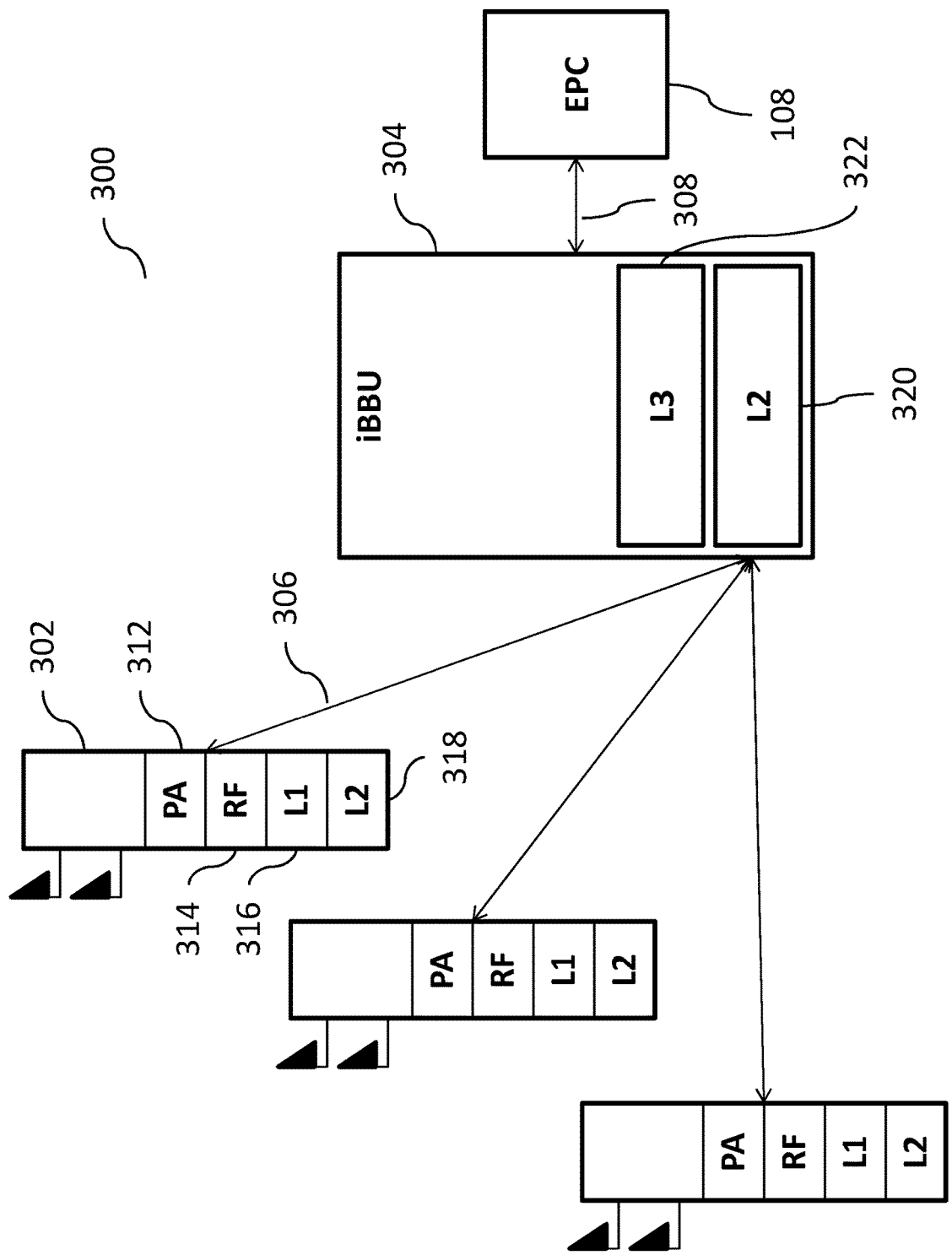
FIG. 3 illustrates an exemplary intelligent Long Term Evolution Radio Access Network, according to some implementations of the current subject matter.

FIG. 3 illustrates an exemplary system 300, according to some implementations of the current subject matter. The system 300 can be implemented as a centralized cloud radio access network ("C-RAN"). The system 300 can include at least one intelligent remote radio head ("iRRH") unit 302 and an intelligent baseband unit ("iBBU) 304. The iRRH 302 and iBBU 304 can be connected using Ethernet fronthaul ("FH") communication 306 and the iBBU 304 can be connected to the EPC 108 using backhaul ("BH") communication 308. The user equipment 104 (not shown in FIG. 3) can communicate with the iRRH 302.

In some implementations, the iRRH 302 can include the power amplifier ("PA") module 312, the radio frequency ("RF") module 314, LTE layer L1 (or PHY layer) 316, and a portion 318 of the LTE layer L2. The portion 318 of the LTE layer L2 can include the MAC layer and can further include some functionalities/protocols associated with RLC and PDCP, as will be discussed below. The iBBU 304 can be a centralized unit that can communicate with a plurality of iRRH and can include LTE layer L3 322 (e.g., RRC, RRM, etc.) and can also include a portion 320 of the LTE layer L2. Similar to portion 318, the portion 320 can include various functionalities/protocols associated with RLC and PDCP. Thus, the system 300 can be configured to split functionalities/protocols associated with RLC and PDCP between iRRH 302 and the iBBU 304.

In some implementations, the current subject matter system can implement and/or otherwise use transmission control protocol ("TCP") for the purposes of data transmissions between a user equipment and a server via an eNodeB. The eNodeB can handle TCP transmissions and can include a TCP processor that can act as a component for managing such data transmissions.

TCP is considered as one of the core protocols of the Internet protocol suite ("IP") and provides reliable, ordered, error-checked delivery of a stream of octets between programs running on devices that can be connected to a network (e.g., a local area network, intranet or the public Internet. TCP resides in the transport layer. TCP accepts data from a data stream, divides it into chunks, and adds a TCP header, which creates a TCP segment. The TCP segment is then encapsulated into an IP datagram and exchanged with peer devices.

A TCP segment includes a TCP header and a data section. The TCP header contains ten mandatory fields and an optional extension field. The data section follows the header and includes payload data carried for an application. The length of the data section is calculated by subtracting the combined length of the TCP header and the encapsulating IP header from the total IP datagram length (as specified in the IP header). Web browsers or other applications use TCP, when they connect to servers on the World Wide Web, to deliver payload data (e.g., email, files, etc.) and/or transfer files from one location to another.

TCP protocol operations include three phases: connection establishment, data transfer, and connection termination. Connection establishment involves a multi-step handshake process which is followed by the data transfer phase. After data transmission is completed, the connection termination phase closes established virtual circuits and releases all allocated resources. TCP connections are managed by an operating system through a programming interface that represents an endpoint for communications, i.e., an Internet socket.

To establish a connection, TCP uses a three-way handshake. However, before a client (e.g., a software application, an endpoint device (e.g., a personal computer, a wireless device, a server, etc.)) can connect to a server, the server performs a passive open procedure (i.e., binding to and listening at a port to open it up for connections). Once established, the client application initiates an active open. During the active open, the three-way handshake includes: sending a SYN packet from the client to the server, where the client sets the segment's sequence number to a random value; sending a SYN-ACK packet from the server in reply, where the packet includes an acknowledgment number that is set to one more than the received sequence number and a sequence number chosen by the server for the packet, where the sequence number is another random number; and sending an ACK packet from the client back to the server. In the ACK packet, the sequence number is set to the received acknowledgement value and the acknowledgement number is set to one more than the received sequence number.

To terminate a connection, a four-way handshake is used, where each side (client and server) terminates connection independently. When an endpoint device wishes to stop its half of the connection, it transmits a FIN packet, where the other endpoint device acknowledges with an ACK packet. Thus, connection termination typically includes a pair of FIN and ACK packets from each TCP endpoint device.

Transmission of data using TCP can occur between devices in wired and/or wireless communications networks. To allow use of the TCP for data transmission purposes between user equipment in a wireless network (such as networks discussed in connection with FIGS. 1*a*-3 above) and servers, a TCP processor can be included in the eNodeB.

Figure 4:
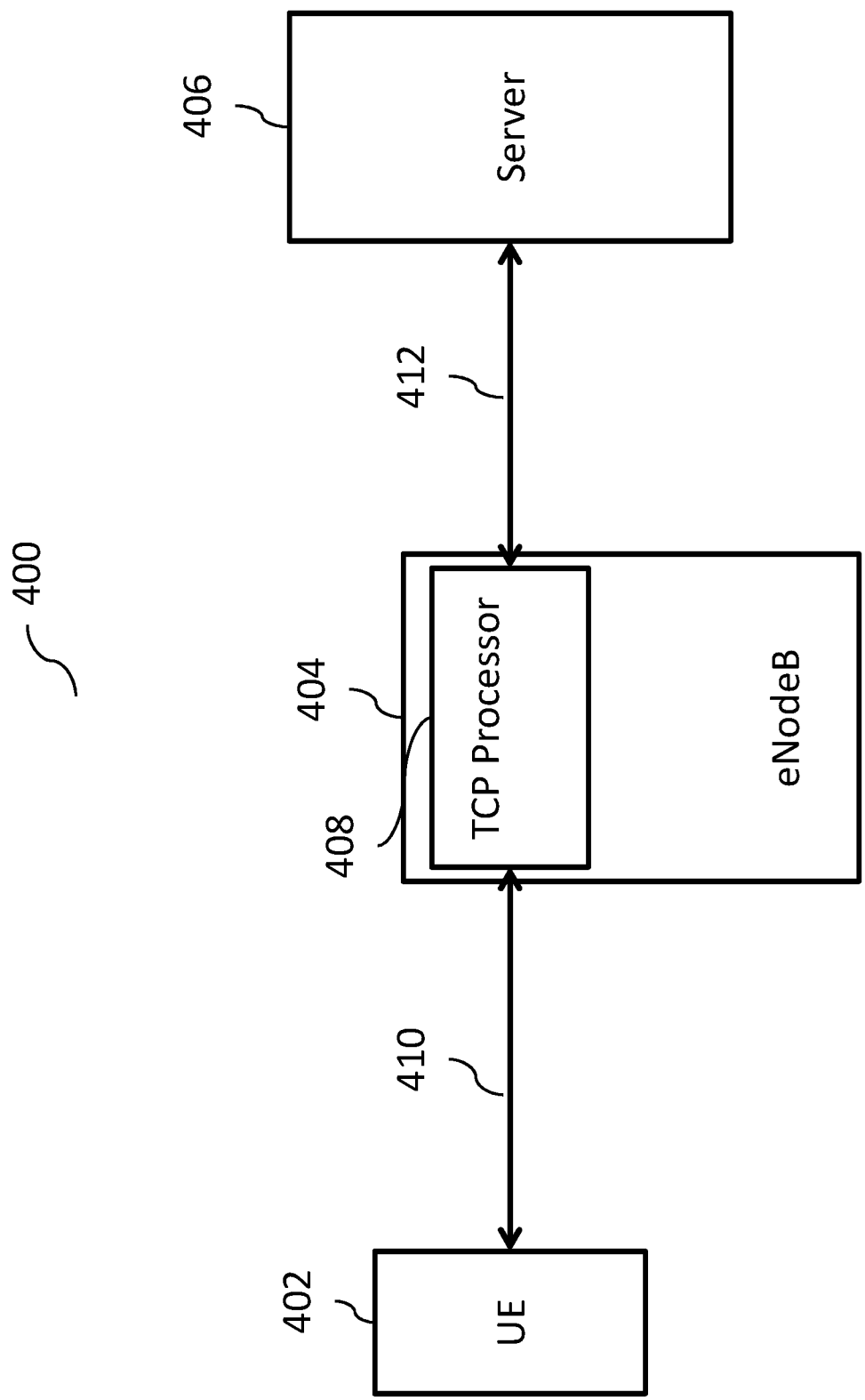
FIG. 4 illustrates an exemplary communications system that includes a transmission control protocol ("TCP") functionality in a base station, according to some implementations of the current subject matter.

FIG. 4 illustrates an exemplary system 400 having a TCP processor 408 in an eNodeB, according to some implementations of the current subject matter. The system 400 can include an eNodeB 404 and/or any other type of base station communicatively coupled with a user equipment 402 via an over-the-air link 410 and with a server 406 via link 412. The server 406 can be part of the core network (not shown in FIG. 4) and/or can be a server outside of the core network. The server 406 can include and/or obtain data that is desired by the user equipment 402. The user equipment 402 can communicate with the eNodeB 404, as discussed above in connection with FIGS. 1a-3. The eNodeB 404 can include the structure shown in FIG. 3 and discussed above.

In some implementations, the TCP processor 408 can be a software module and/or any combination of hardware and/or software components that can be disposed in a base station (e.g., eNodeB 404). These components can be separate from other components of the base station and/or share components with other hardware and/or software disposed in the base station.

The user equipment 402 and the server 406 can establish a connection in accordance with the transmission control protocol. The processor 408, disposed in the base station 404, can perform monitoring of the connection between the user equipment 402 and the server 406, including monitoring of the transmission of data packets as well as acknowledgements sent by the user equipment 402. Additionally, the processor 408 can change various parameters in one or more data packets and/or segments being transmitted.

In TCP transmissions, throughput of a communication can be limited by two windows: a congestion window ("CNWD") and a receive window ("RW"). CNWD determines the number of bytes that can be outstanding at any time during a TCP transmission. This is different from TCP window size maintained by the receiver of data. CNWD prevents a link between two endpoints of the connection from getting overloaded with too much data traffic. The size of CNWD is calculated by estimating how much congestion there is between the two endpoints. The sender of data typically maintains CNWD. When a connection is set up, CNWD (a value maintained independently at each host) is set to a small multiple of the maximum segment size ("MSS") allowed on the connection. Further variance in the congestion window is determined by the known additive increase/multiplicative decrease ("AIMD") approach (i.e., a feedback control algorithm used in TCP congestion avoidance, which increases transmission rate (window size) until data loss occurs and/or increases CNWD by a fixed amount every round trip time. When congestion is detected, the transmitter decreases the transmission rate by a multiplicative factor (e.g., cut the congestion window in half after data loss)). If all segments are received and the acknowledgments reach the sender on time, a constant value is added to the window size. The window grows exponentially until a timeout occurs or the receiver reaches its limit (a threshold value "ssthresh"). After this, CNWD increases linearly at the rate of 1/(congestion window) packets on each new acknowledgement received. When timeout occurs, the following occurs: congestion window is reset to 1 MSS, "ssthresh" is set to half the window size before packet loss started, and "slow start" is initiated. A system administrator can adjust the maximum window size limit and/or adjust the constant added during additive increase, as part of TCP tuning. The flow of data over a TCP connection is also controlled by RW, which is provided by the receiver of data. The sender determines how much data it can send by comparing its own CNWD with RW.

To avoid congestion, CNWD should not exceed capacity of the network on which the data is transmitted. To control flow of data, RW should not exceed capacity of receiver equipment to process data. The receiver equipment can be overwhelmed by data if the receiver (e.g., a Web server) is very busy. Typically, each TCP segment can contain a current value of RW. If a sender receives an ACK, specifying RW size of 5000 bytes, the sender will not send data packets after byte 5000, even if the CNWD allows it.

Figure 5:
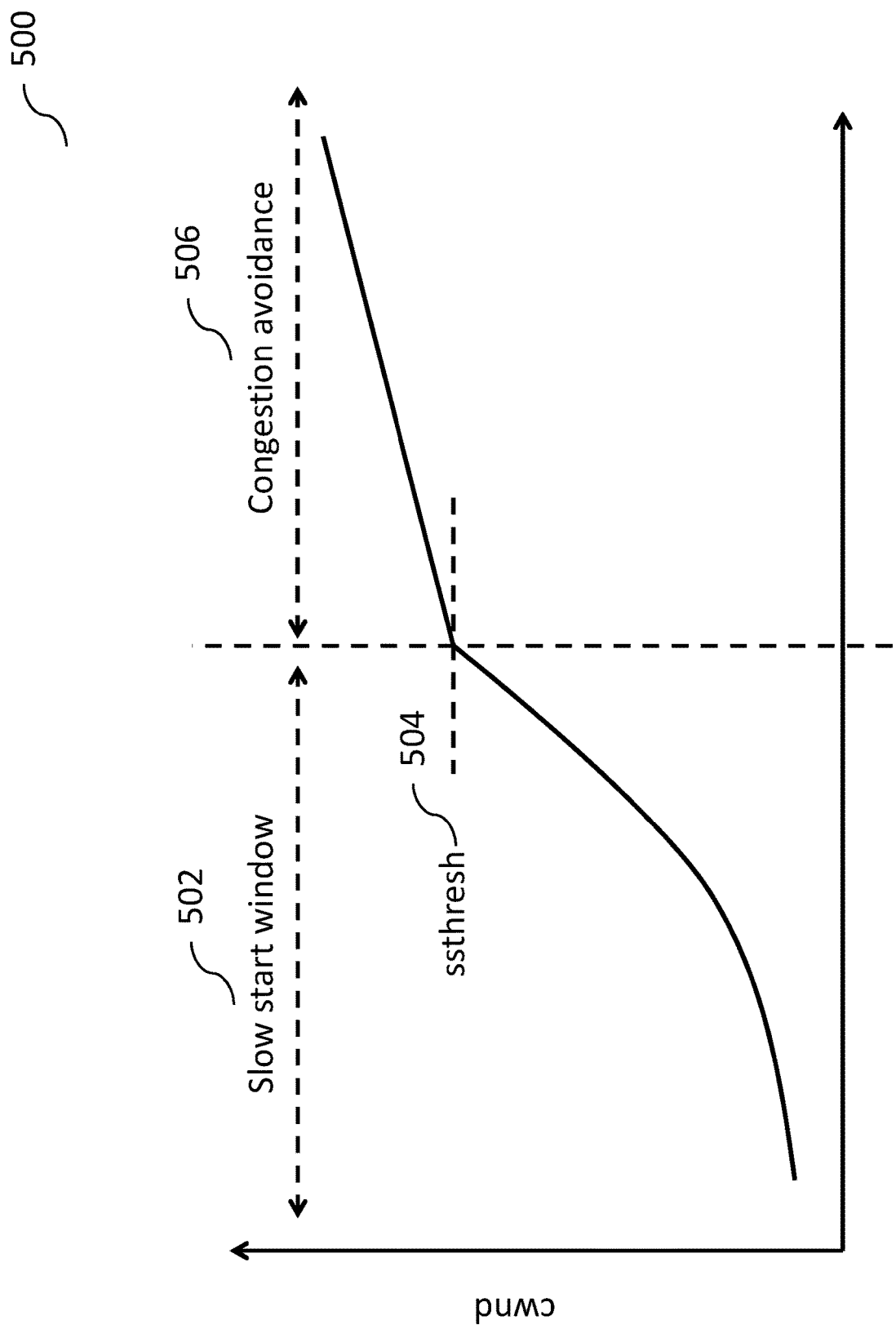
FIG. 5 illustrates an exemplary congestion window control in TCP communications.

In some implementations, the TCP processor 408 can implement control of initial window ("IW"), RW, and CNWD and/or perform other TCP-related functions to avoid congestion of a connection and thus, a loss of data packets. As shown in FIG. 5, in the slow start window 502 and prior to reaching the "ssthresh" threshold value 504, the TCP processor 408 can perform assignment of priority to data packets. Additionally, during the slow start window 502, the TCP processor 408 can perform an aggressive scheduling of data packets for transmission in the event that there exists a good radio frequency signal between the user equipment 402 and the eNodeB 404. Conversely, if a poor radio frequency is detected between the user equipment 402 and the eNodeB 404, the TCP processor 408, during the slow start window 502, can conservatively schedule data packets for transmission. This way, congestion of the connection, multiple retransmissions and/or loss of data can be avoided.

Further, during the slow start window, the congestion window size can double in size with each round trip that the packet takes, i.e., each time an acknowledgement is received by the server that the packet has been successfully transmitted to and received by the endpoint device, the size of congestion window can increase (depending on the TCP implementation, the size of the congestion window can increase accordingly). Thus, the increase in size of the congestion window can be exponential. Once the congestion avoidance phase is reached, the size of the congestion window can only be increased linearly, as indicated by the straight line in congestion avoidance phase 506 in FIG. 5.

TCP performance can be severely penalized when the server detects packet loss. In some TCP implementations, during TCP transmission session, if the server receives duplicate acknowledgements (e.g., three duplicate acknowledgement ("DUP ACKs")), the server can determine that a particular TCP packet has not been received by the endpoint device and ascertain that there is congestion, which will cause the server to reset the congestion window and reduce the "ssthresh" value (e.g., by one half). This situation is illustrated in FIG. 6.

Figure 6:
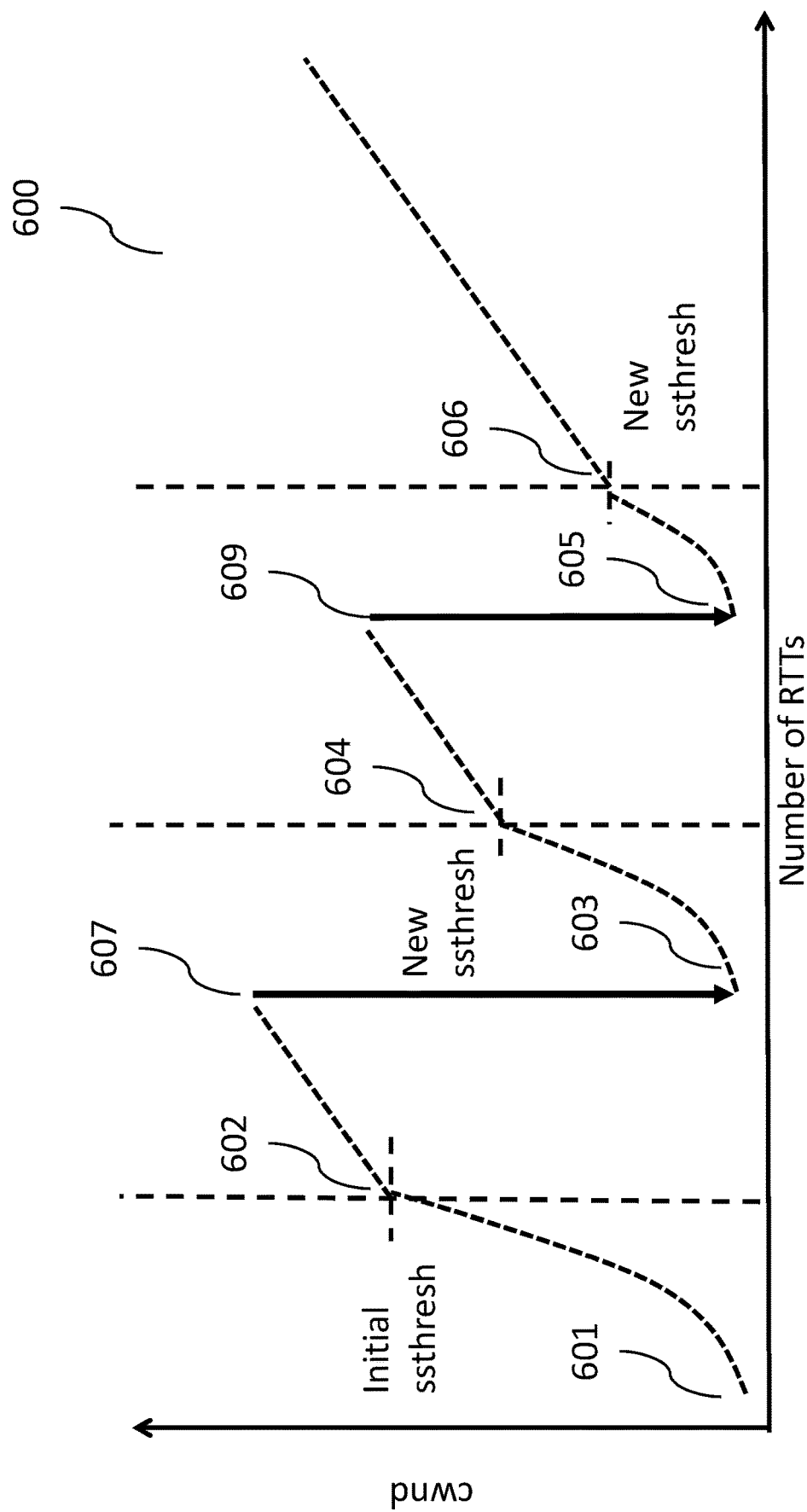
FIG. 6 illustrates further details of congestion window control in TCP communications.

As shown in FIG. 6, a performance of the TCP transmission is illustrated on a plot having a size of congestion window ("CNWD") on the vertical axis and number of roundtrip times ("RTT") (corresponding to the time that it takes the server to receive an acknowledgement that a packet was received) on the horizontal axis. In the slow start phase, the congestion window continues to grow exponentially from an initial size of the congestion window 601. The size of the window grows until an initial threshold 602, after which the size of the congestion window grows linearly until the server (sending the TCP packets) receives an indication that three duplicate ACKs have been received, at 607. Once two duplicate ACKs have been received, the value of the ssthresh is reduced to a half of the current CNWD. If a loss is detected by the server (e.g., at a time-out), then the CNWD can be set to the initial value 601 and the process of growing the size of the congestion window begins again. The value of the ssthresh can be set higher than the previous value (which can depend on the value of current CNWD).

The new value of ssthresh 604 can be half of the CNWD (for different TCP implementations (e.g., TCP-Reno, TCP-Vegas, etc.) new ssthresh values can be different and/or congestion avoidance can be implemented in a different fashion). The growth of the size of the congestion window can continue until another three DUP ACKs are received, at 609. At that time, the congestion window is reset to 605 and the value of ssthresh 604 is reduced to ssthresh 606. Then, the process of growing the congestion window can begin again. At some point during this process, the server can determine that the endpoint device is unable to receive its transmissions and terminate the transmission session.

In contrast to an ideal TCP transmission lossless environment, a wireless communications environment can involve a substantial loss of packets. This can cause a server transmitting TCP packet data to constantly reset the congestion window, drop connections, etc., thereby causing substantial delay in delivery of packets, battery drainage, and other undesirable consequences. Data loss can occur as a result of various factors associated with wireless transmissions. For example, in a wireless communications environment, movement of the user equipment from one radio area having a good signal to another radio area having a poor signal can cause delay in delivery of the packets and corresponding ACKs to the server, thereby causing the server to determine that there is congestion on the line. Interference from other radio sources (e.g., other user equipment) can also cause losses. Other factors can affect packet loss as well.

One of the functions of the eNodeB 106 referred to in Layer 3 of FIG. 1C is radio resource management ("RRM"), which includes scheduling of both uplink and downlink air interface resources for user equipment 104, control of bearer resources, and admission control. The RRM function ensures efficient use of the available network resources. In particular, RRM in E-UTRAN manages (e.g., the ME and assign, reassign, and release) radio resources in single and multi-cell environments. RRM is treated as a central application at the eNodeB responsible for interworking between different protocols so that messages are properly transferred to different nodes across Uu, S1, and X2 interfaces. RRM interfaces with operation and management functions in order to control, monitor, audit, or reset the status due to errors at a protocol stack.

The RRM includes modules for radio bearer control ("RBC"). The RBC functional module manages the establishment, maintenance, and release of radio bearers. The RRM also includes modules for connection mobility control ("CMC"). The CMC module manages radio resources in the idle and connected modes. In the idle mode, this module defines criteria and algorithms for cell selection, reselection, and location registration that assist the user equipment in selecting or camping on the best cell. In addition, the eNodeB broadcasts parameters that configure the user equipment measurement and reporting procedures. In the connected mode, this module manages the mobility of radio connections without disruption of services.

The RRM also includes modules for dynamic resource allocation ("DRA") and/or packet scheduling ("PS"). The task of DRA or PS is to allocate and de-allocate resources (including physical resource blocks) to user and control-plane packets. The scheduling function typically considers the QoS requirements associated with the radio bearers, the channel quality feedback from the user equipments, buffer status, inter-cell/intra-cell interference condition, and the like. The DRA function takes into account restrictions or preferences on some of the available resource blocks or resource-block sets due to inter-cell interference coordination ("ICIC") considerations.

The radio access network including the eNodeBs provided therein is responsible for handling all radio-related functionality including scheduling of radio resources. The core network is responsible for routing calls and data connections to external networks.

The scheduler in the eNodeB is generally responsible for assigning radio resources to all user equipments and radio bearers both in the uplink and downlink. The scheduler in the eNodeB allocates resource blocks (which are the smallest elements of resource allocation) to users for predetermined amounts of time.

Both the LTE multiplexing modes can offer asymmetric bandwidth to the data. Low uplink bandwidth in asymmetric links can disrupt the flow of acknowledgements, which can affect performance. Further, in a multi-user wireless system, depending on user location, interference from neighboring cell, and/or any other factors, the bandwidth asymmetry can be worse than nominal values for an LTE system. The bandwidth asymmetry can be characterized by the following parameters: raw bandwidth asymmetry and normalized bandwidth asymmetry k. The raw bandwidth asymmetry can be defined as a ratio of downlink bandwidth to uplink bandwidth for a link. The normalized bandwidth asymmetry k can be defined as a ratio of transmission time for ACKs on an uplink path to transmission time for downlink packet on downlink path, i.e., a ratio of downlink link speed in packets per second to uplink speed in ACKs per second in the uplink. Links with $k>1$ can have a higher probability for ACK clock disruption and low throughput efficiency compared to links with $k<1$ because these links can have sufficient uplink bandwidth for ACKs. Despite high raw bandwidth asymmetry, the LTE links can achieve low normalized bandwidth asymmetry because of a lower size of downlink ACK packets without ACK clock disruption.

However, if additional TCP connections that send traffic in the uplink direction exist, disruptions can occur. In this case, both downlink ACK and uplink data packets may have to compete for bandwidth allocation over the same narrow uplink.

Figure 7:
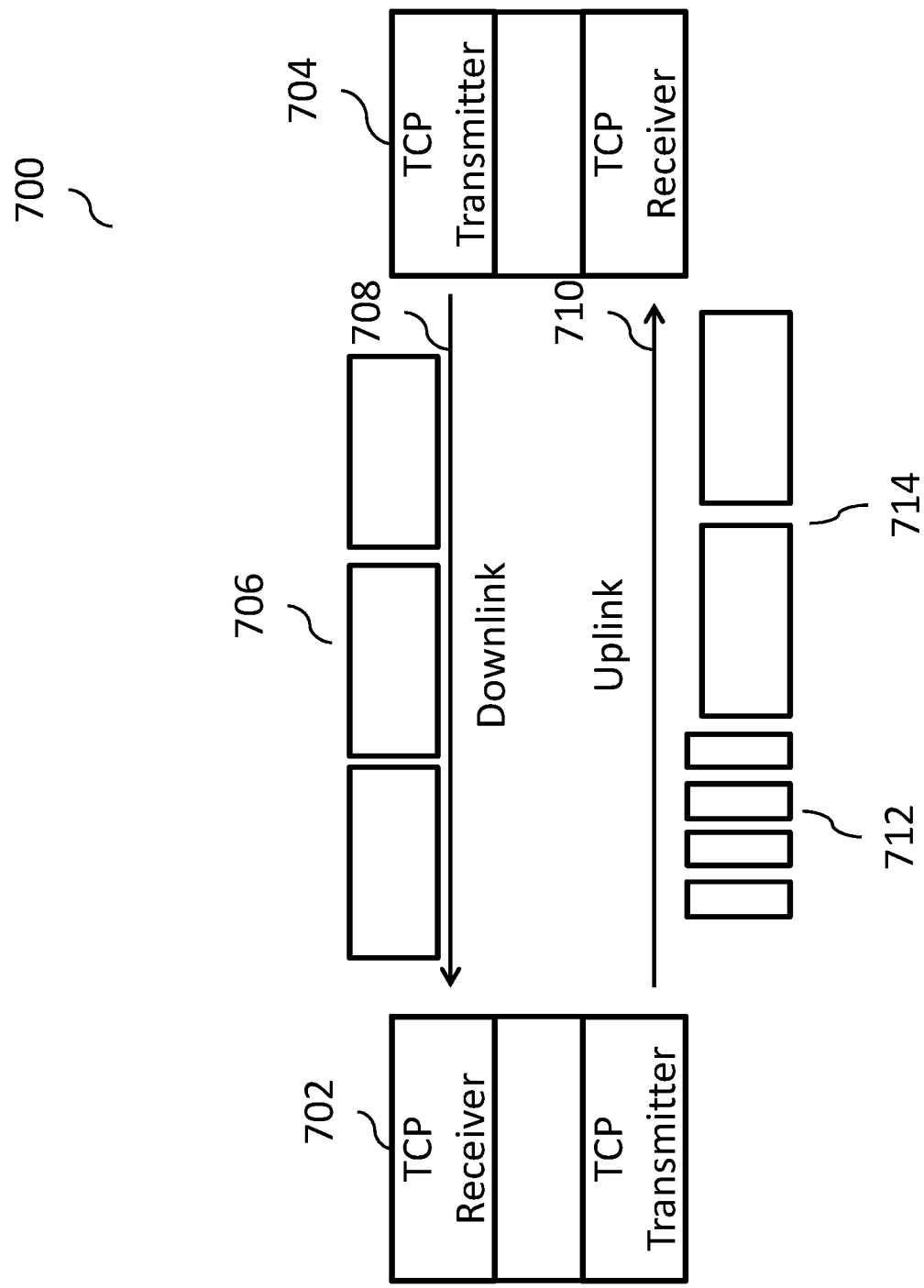
FIG. 7 illustrates an exemplary system for transmission of data packets in a wireless communications systems, according to some implementations of the current subject matter.

FIG. 7 illustrates an exemplary system 700 for transmission of data packets in a wireless communications system, according to some implementations of the current subject matter. The system 700 can include a TCP receiver 702 and a TCP transmitter 704 communicating with one another on a downlink 706 and an uplink 710. Downlink data packets 706 can be transmitted on the downlink 708 and their acknowledgements (ACKs) 712 can be transmitted on the uplink 710. Additionally, the uplink 714 can also transmit uplink data packets that can be sent from the receiver 702 to the transmitter 704. The ACKs 712 and the uplink data packets 714 compete for bandwidth on the uplink 710, which can cause a delay in arrival of the ACKs to the transmitter 704. Further, the ACK packets can have fewer scheduling opportunities as compared to the uplink data packets. Scheduling of transmission of downlink ACKs can depend on a size of an uplink data packet and ACK rate (in pps) of the uplink. This can cause a delay in arrival of the downlink ACK packets at the transmitter 704 and thus, can increase a round trip time ("RTT") for downlink data packets. This can cause poor efficiency of the downlink, decreased throughput, congestion, duplication of transmission of the downlink packets, as well as other issues that can slow down performance of the network 700.

In some cases, by sending too many packets, the TCP sender (e.g., a TCP server) can cause a buffer of eNodeB to overflow. This can occur in view of the buffer having a limited amount of space that can accommodate incoming packets from the TCP sender.

The R-WND can be determined using a round trip time ("RTT") associated with a communications link between the receiver 702 and the transmitter 704. The determination can also use an average link rate, which can be determined at least based on a rate at which buffer is cleared by the MAC/RLC components of the transmitter 704. An uplink R-WND can be determined by calculating the receive rate at the transmitter of uplink data segments. The R-WND can also be based on a queue control parameter, which can be determined based on the particular communications link, and a maximum queue size per bearer, which can be based on a total queue size. The total number of buffered bytes, which can be determined based on a combination of buffer sizes of buffers at the PDCP component (not shown in FIG. 7), and a number of active transmission flows can also be used in determining the R-WND.

Figure 8:
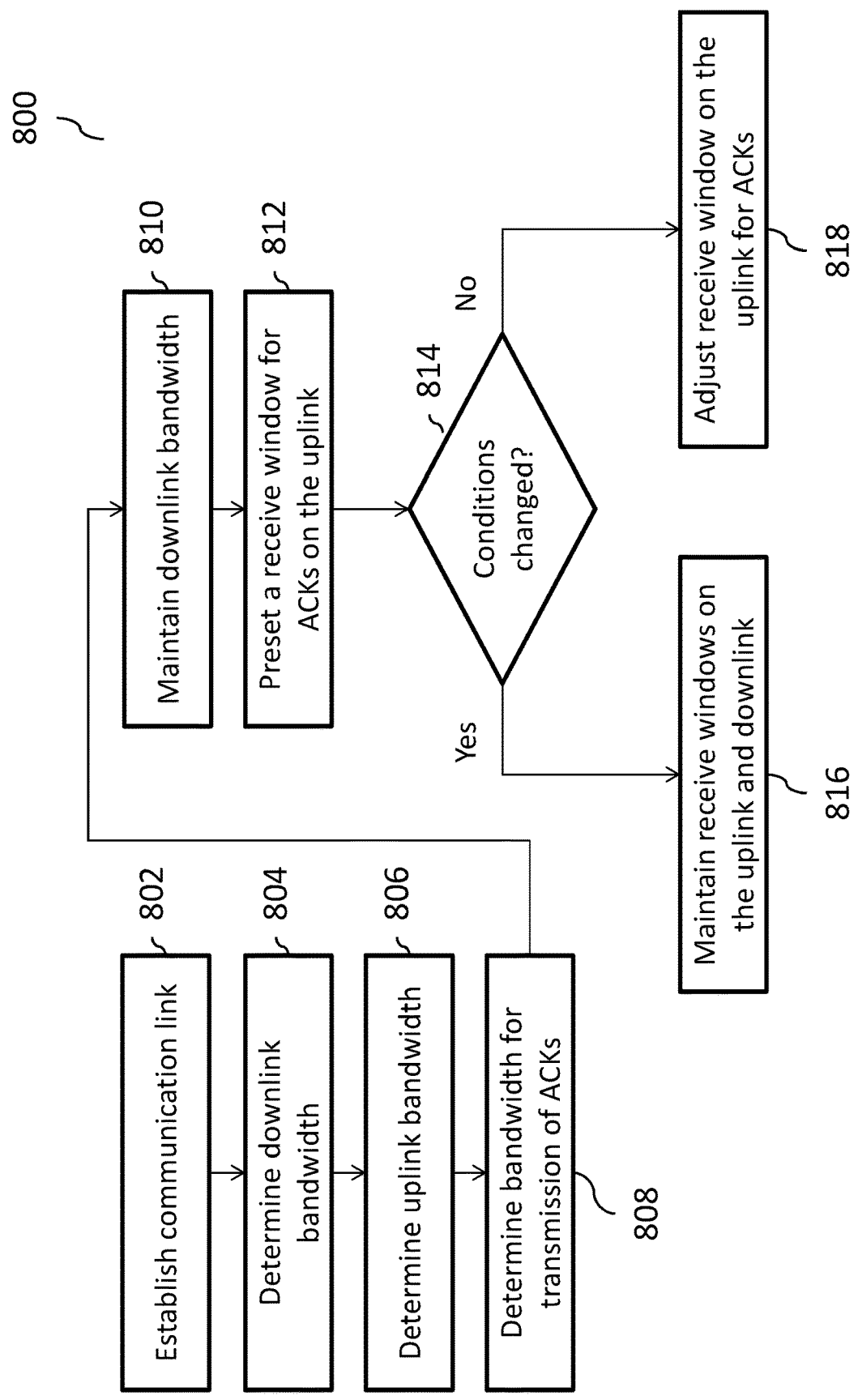
FIG. 8 illustrates an exemplary process for performing dynamic adaption of a TCP receive window in a wireless communication system, according to some implementations of the current subject matter.

FIG. 8 illustrates an exemplary process 800 for performing dynamic adaption of a TCP receive window in a wireless communication system, according to some implementations of the current subject matter. At 802, a communication link can be established between a user equipment and a network device, such as a TCP server. The communication link can be monitored by a base station (e.g., an eNodeB 704 shown in FIG. 7). Based on the established communication link, an amount of downlink connection throughput or bandwidth (i.e., a flow from the network device to the user equipment 702, as shown in FIG. 7) can be determined (this can be done by the base station 704), at 804. In some exemplary, non-limiting implementations, the amount of downlink throughput can be approximately 70 Mbps, however, any other values can be possible. At 806, an amount of an uplink connection throughput or bandwidth (i.e., a flow from the user equipment 702 to the network device) can be determined. In some exemplary, non-limiting implementations, the amount of uplink throughput can be approximately 16 Mbps, however, any other values can be possible. The uplink connection can be shared by the data that is being sent from the user equipment to the network device as well as ACKs indicating receipt of data packets received by the user equipment (and hence, the network device sending the data packets to the user equipment).

Based on the data that is being transmitted to the user equipment on the downlink, a determination can be made as to the amount of bandwidth that may be required for transmission of ACKs indicative of the receipt of the data packets by the user equipment on the downlink connection, at 808. In some exemplary, non-limiting implementations, the determination can be based on an approximation that assumes that an ACK is received for every downlink data packet and that the size of the ACK is 52 bytes.

As the downlink flows continue from the network device to the user equipment, the user equipment continues to generate ACKs to advise the network device (and, hence, the network device sending the data packets) that data packets have been received. This can occur while the base station monitors the downlink and uplink. At 810, a predetermined receive window or bandwidth on the downlink connection can be maintained. This can be done based on systems requirements, capabilities, etc. while monitoring the uplink connection. Based on the maintained receive window on the downlink connection and monitoring of the uplink connection, the current subject matter can preset a particular receive window for the ACKs being transmitted on the uplink connection from the user equipment to the network device, at 812.

A check can be performed to determine whether conditions on either the uplink and/or the downlink have changed, which may require adjusting the receive window for the ACKs on the uplink connection, at 814. If so, the receive window on the uplink connection for the ACKs can be adjusted while maintaining the same receive window on the downlink connection, at 816. In some exemplary, non-limiting implementations, the adjustment can be performed based on one or more samples taken at 100 milliseconds, which are used to determine whether bandwidth required for the uplink ACKs is sufficient, i.e., whether the uplink-ACK-allotted bandwidth is being fully consumed by the uplink ACKs. If so, then more bandwidth can be allocated to the uplink ACKs, whereby lesser bandwidth is allocated to other uplink data packets (and vice versa). If not, the preset receive window for the uplink connection for the ACKs and the receive window for the downlink connection can be maintained, at 818.

Figure 9:
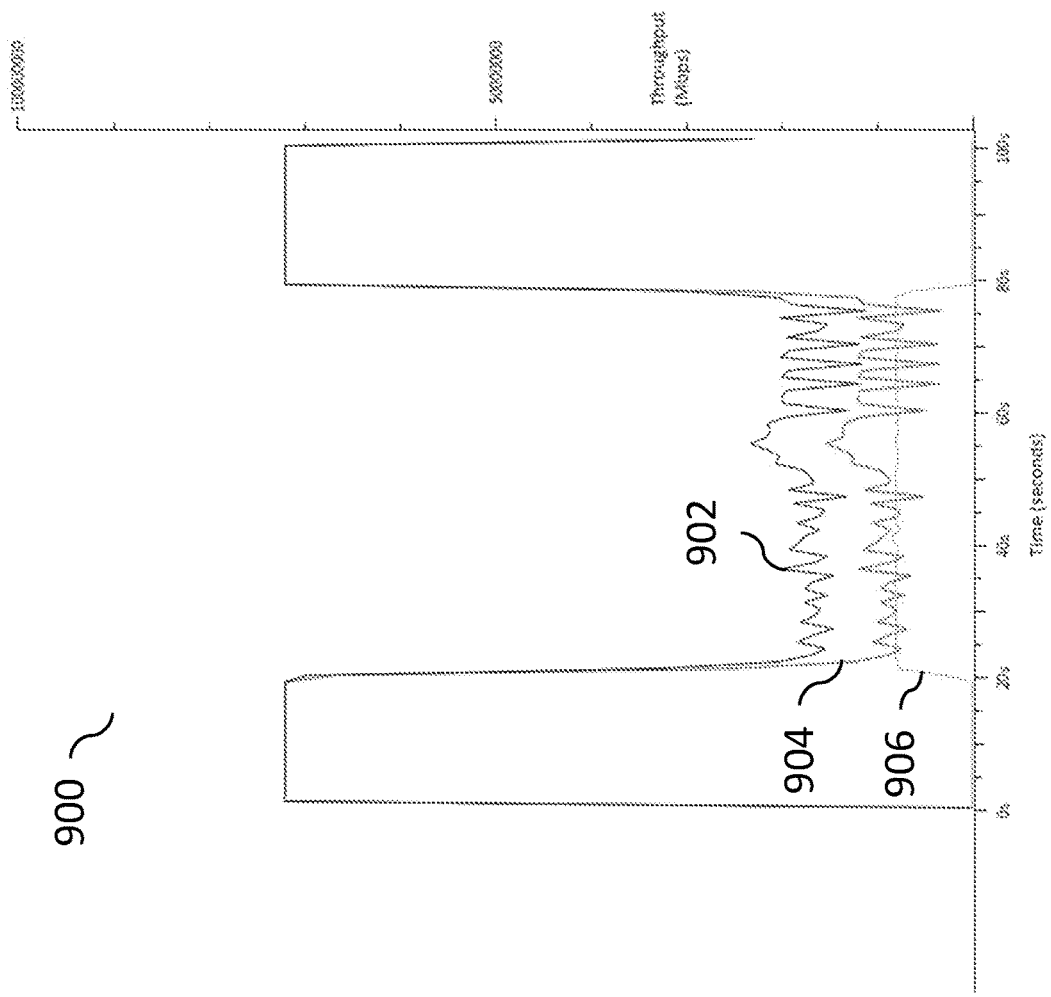
FIG. 9 illustrates a plot showing an operation of a conventional system without adjustment of an uplink receive window in order to maintain downlink throughput.
Figure 10:
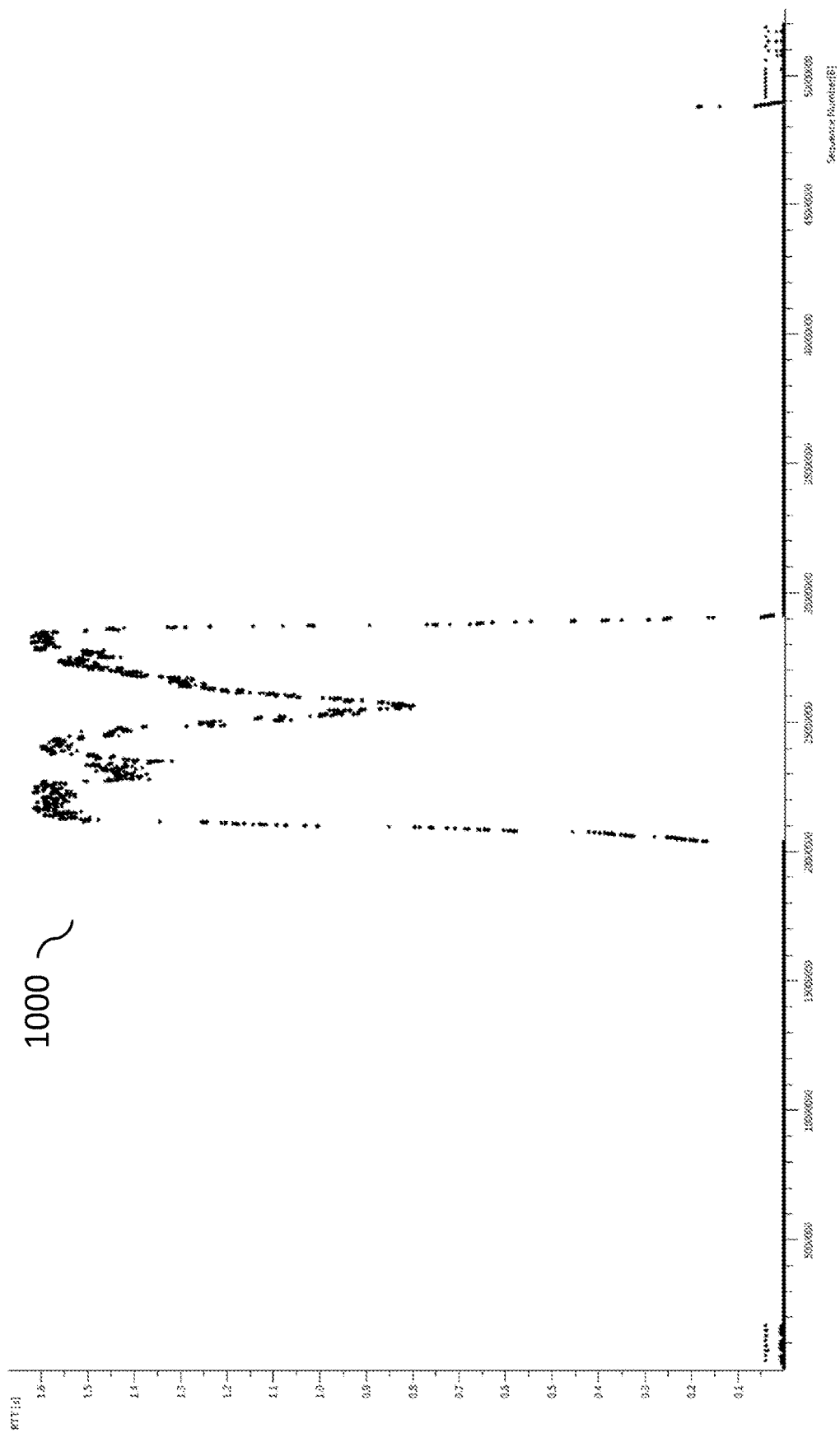
FIG. 10 illustrates plot showing a significant increase of a round trip time at the time the uplink flows start in the conventional system operation shown in FIG. 9.
Figure 11:
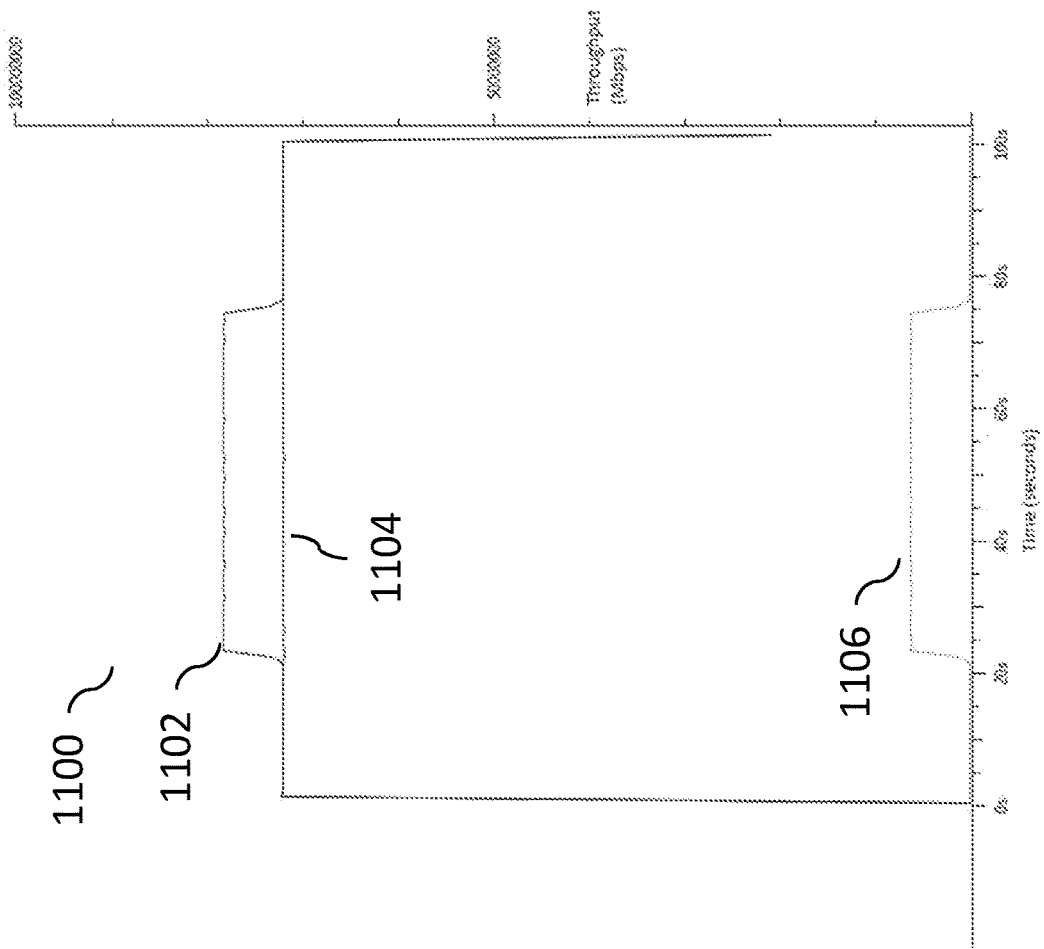
FIG. 11 illustrates a plot showing an operation of the current subject matter system that is capable of adjusting an uplink receive window in order to maintain downlink throughput, according to some implementations of the current subject matter.
Figure 12:
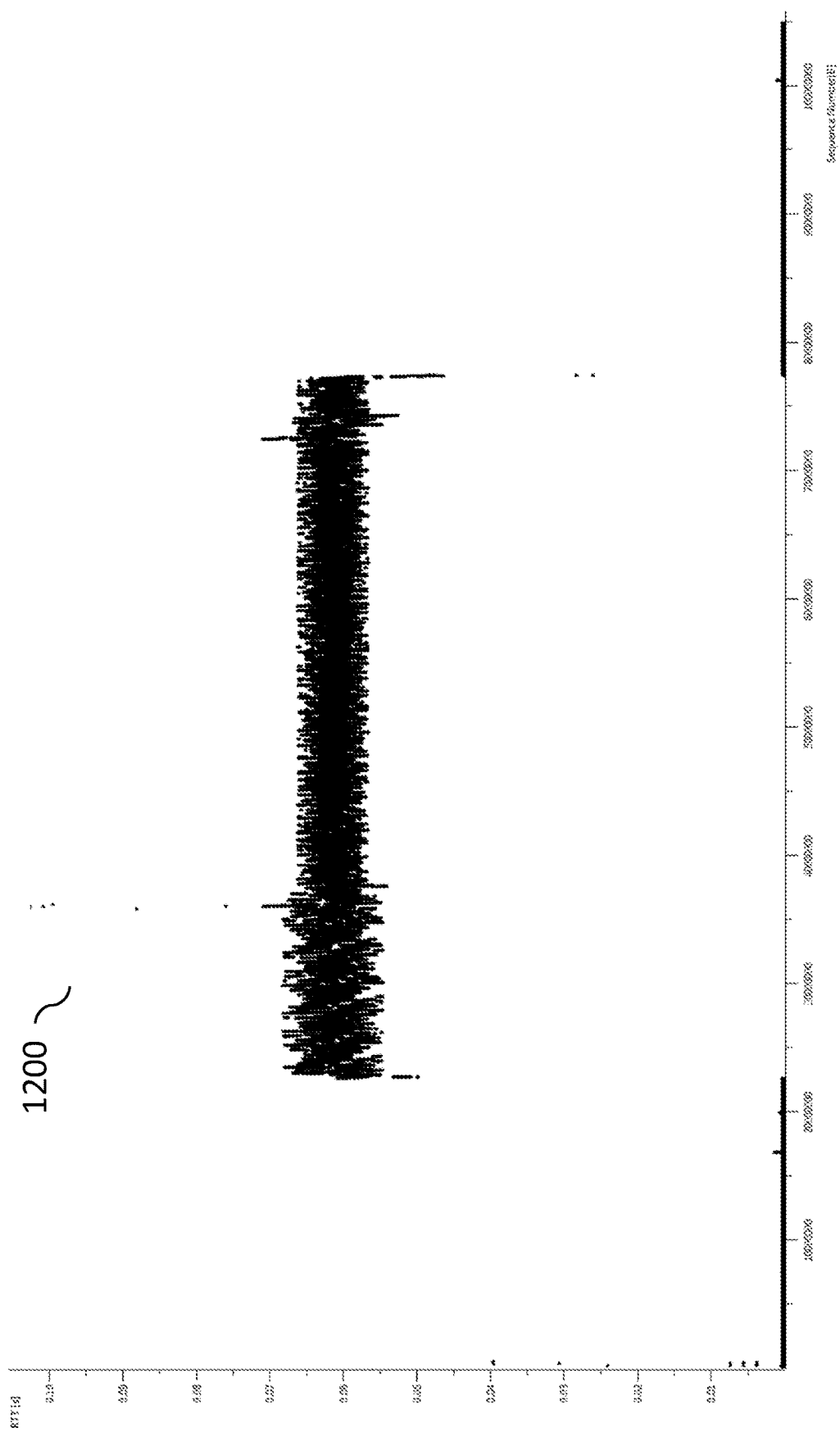
FIG. 12 illustrates plot showing that the round trip time remains unaffected during operation of the current subject matter system shown in FIG. 11.

FIGS. 9-12 illustrate various exemplary experimental setups illustrating advantages of the process 800. FIGS. 9-10 illustrate operation of a conventional system without an ability to adjust uplink bandwidth in order to maintain downlink throughput. FIGS. 11-12 illustrate operation of the current subject matter system, which is capable of adjusting uplink receive window in order to maintain downlink throughput.

FIG. 9 illustrates a plot 900 showing an operation of a conventional system without adjustment of an uplink receive window in order to maintain downlink throughput. In FIG. 9, curve 904 illustrates downlink bandwidth consumption, curve 906 illustrates uplink bandwidth consumption, and curve 902 is a total throughput of downlink and uplink connection bandwidths. The receive window on the uplink and downlink flows is 500 Kbytes, where the downlink throughput is maintained at 70 Mbps and uplink throughput is 8 Mbps. As shown in FIG. 9, 70 Mbps throughput on the downlink was maintained at the start of the downlink traffic (i.e., curve 904) until approximately 20 seconds, at which time the uplink traffic is initiated (i.e., curve 906). At the start of the uplink traffic, the downlink traffic begins to decrease drastically during the lifetime of uplink flows (i.e., at approximately 70 seconds). Once, the uplink flows are completed, the downlink flow throughput increases again to its original value it had at the start. Thus, initiation of the uplink traffic flows significantly affected the downlink throughput to less than 30% of its original value. FIG. 10 illustrates plot 1000 showing a significant increase of a round trip time at the time the uplink flows start.

FIG. 11 illustrates a plot 1100 showing an operation of the current subject matter system that is capable of adjusting an uplink receive window in order to maintain downlink throughput. In FIG. 11, curve 1104 illustrates downlink bandwidth consumption, curve 1106 illustrates uplink bandwidth consumption, and curve 1102 is a total throughput of downlink and uplink connection bandwidths. The receive window on the downlink flows is 500 Kbytes, while on the uplink flow it is 5200 bytes, where the downlink throughput is maintained at 70 Mbps and uplink throughput is 8 Mbps. As shown in FIG. 11, 70 Mbps throughput on the downlink was maintained at the start of the downlink traffic (i.e., curve 1104) until approximately 20 seconds, at which time the uplink traffic is initiated (i.e., curve 106). Using the dynamic adaptation of the receive window on the uplink, at the start of the uplink traffic, there no effect (or relatively little) on the downlink traffic during the lifetime of uplink flows (i.e., at approximately 70 seconds). Once, the uplink flows are completed, the downlink flow throughput remains the same as its original value it had at the start. Thus, initiation of the uplink traffic flows has no effect on the downlink throughput using the dynamic adaption process 800 shown in FIG. 8. FIG. 12 illustrates plot 1200 showing the round trip time remains unaffected as well.

Figure 13:
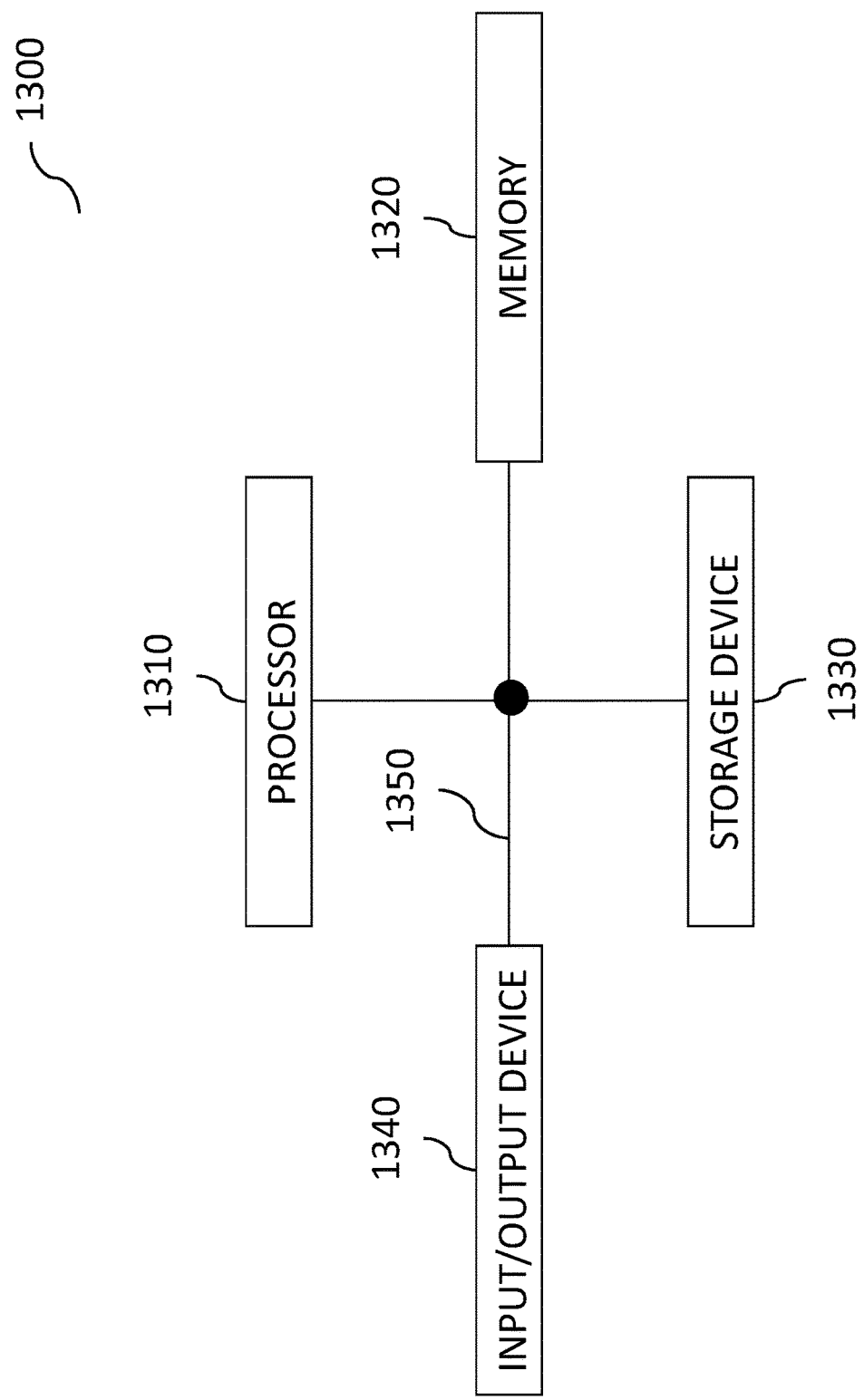
FIG. 13 illustrates an exemplary system, according to some implementations of the current subject matter.

In some implementations, the current subject matter can be configured to be implemented in a system 1300, as shown in FIG. 13. The system 1300 can include one or more of a processor 1310, a memory 1320, a storage device 1330, and an input/output device 1340. Each of the components 1310, 1320, 1330 and 1340 can be interconnected using a system bus 1350. The processor 1310 can be configured to process instructions for execution within the system 600. In some implementations, the processor 1310 can be a single-threaded processor. In alternate implementations, the processor 1310 can be a multi-threaded processor. The processor 1310 can be further configured to process instructions stored in the memory 1320 or on the storage device 1330, including receiving or sending information through the input/output device 1340. The memory 1320 can store information within the system 1300. In some implementations, the memory 1320 can be a computer-readable medium. In alternate implementations, the memory 1320 can be a volatile memory unit. In yet some implementations, the memory 1320 can be a non-volatile memory unit. The storage device 1330 can be capable of providing mass storage for the system 1300. In some implementations, the storage device 1330 can be a computer-readable medium. In alternate implementations, the storage device 1330 can be a floppy disk device, a hard disk device, an optical disk device, a tape device, non-volatile solid state memory, or any other type of storage device. The input/output device 1340 can be configured to provide input/output operations for the system 1300. In some implementations, the input/output device 1340 can include a keyboard and/or pointing device. In alternate implementations, the input/output device 1340 can include a display unit for displaying graphical user interfaces.

FIG. 14 illustrates an exemplary method 1400 for transmission of data packets to a user device, according to some implementations of the current subject matter. The method 1400 can be performed using a base station (e.g., an eNodeB as described above and shown in FIGS. 3-13). At 1402, a communication link can be established between a first device (e.g., a network device, a server, etc.) and a second device (e.g., a user equipment) in accordance with a transmission control protocol for transmission of a data packet between the first device and the second device. At 1404, the communication link can be monitored, by the base station, during transmission of the data packet from the second device to the first device. At 1406, at least a portion of a bandwidth available for transmission of an acknowledgement from the second device to the first device can be adjusted based on the monitoring. The acknowledgement ("ACK") can indicate receipt of the data packet performing by the second device.

In some implementations, the current subject matter can include one or more of the following optional features. An evolved node (eNodeB) base station can perform at least one of the establishing, the monitoring and the adjusting, the eNodeB base station comprising the at least one processor and the at least one memory.

In some implementations, adjusting can include maintaining a predetermined amount of bandwidth for transmission of data packets from the first device to the second device. The adjusting can also include performing adjusting while maintaining the predetermining amount of bandwidth for transmission of data packets from the first device to the second device.

In some implementations, a bandwidth for transmission of data from the second device to the first device can include the portion and at least another portion. Another portion of the bandwidth can be available for transmission of data other than the acknowledgement from the second device to the first device. The adjusting can further include adjusting another portion of the bandwidth.

In some implementations, adjusting can be performed based on at least one condition associated with a communication link communicatively coupling the first device and the second device. The condition can include a round trip time information for the data packet, the round trip time information includes time taken by a transmission of the data packet to the first device and a transmission of an acknowledgement by the first device indicative of the receipt of the data packet at the TCP layer.

In some implementations, the acknowledgement from the second device to the first device indicating that the packet was received by the second device can be generated based on a layer 2 acknowledgement received from the second device by the at least one processor. In some implementations, the second device can transmit to the first device an acknowledgement indicating a receipt of the data packet by the second device upon receiving a confirmation that the data packet was received by the second device, the confirmation being generated by at least one of the following: a media access control (MAC) layer of the eNodeB, a packet data convergence protocol (PDCP) layer of the eNodeB, and a radio link control (RLC) layer.

In some implementations, the processor can be configured to schedule transmission of the data packet from the first device to the second device using the transmission control protocol.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed is:

1. A computer-implemented method for transmission of data packets, the method comprising:
    establishing a communication link between a server in a wireless communication system and a user equipment (UE) in the wireless communication system in accordance with a transmission control protocol for transmission of a data packet between the server and the UE;
    sampling the communication link during uplink transmission of the data packet from the UE to the server at a predetermined time, and determining, based on the sampling, an availability of bandwidth for uplink transmission of an acknowledgement from the UE to the sever, the acknowledgement indicating receipt of the data packet by the UE, wherein a base station in the wireless communication system performs the sampling and the determining, the base station being communicatively coupled with the server and with the UE; and
    adjusting a bandwidth available for uplink transmission of the acknowledgement based on the determined availability of bandwidth.

2. The method according to claim 1, wherein the base station includes an evolved node (eNodeB) base station, the eNodeB base station comprising at least one processor and at least one memory.

3. The method according to claim 1, further comprising maintaining a predetermined amount of bandwidth for transmission of data packets from the server to the UE.

4. The method according to claim 1, wherein a bandwidth for transmission of data from the UE to the server includes the at least the portion and at least another portion, wherein the at least another portion of the bandwidth is available for transmission of data other than the acknowledgement from the UE to the server.

5. The method according to claim 1, further comprising determining at least one condition associated with the communication link communicatively coupling the server and the UE;
wherein the at least one condition includes a round trip time information for the data packet, the round trip time information includes time taken by a transmission of the data packet to the server and a transmission of an acknowledgement by the server indicative of the receipt of the data packet at the TCP layer.

6. The method according to claim 1, wherein the acknowledgement from the UE to the server indicating that the packet was received by the UE is generated based on a layer 2 acknowledgement.

7. The method according to claim 1, wherein the base station transmits to the server an acknowledgement indicating a receipt of the data packet by the UE upon receiving a confirmation that the data packet was received by the UE, the confirmation being generated by at least one of the following: a media access control (MAC) layer of the base station, a packet data convergence protocol (PDCP) layer of the base station, and a radio link control (RLC) layer.

8. An apparatus comprising:
at least one programmable processor; and
a machine-readable medium storing instructions that, when executed by the at least one programmable processor, cause the at least one programmable processor to perform operations comprising:
establishing a communication link between a server in a wireless communication system and a user equipment (UE) in the wireless communication system in accordance with a transmission control protocol for transmission of a data packet between the server and the UE;
sampling the communication link during uplink transmission of the data packet from the UE to the server at a predetermined time, and determining, based on the sampling, an availability of bandwidth for uplink transmission of an acknowledgement from the UE to the server, the acknowledgement indicating receipt of the data packet by the UE, wherein a base station in the wireless communication system performs the sampling and the determining, the base station being communicatively coupled with the server and with the UE; and
adjusting a bandwidth available for uplink transmission of the acknowledgement based on the determined availability of bandwidth.

9. The system according to claim 8, wherein the base station includes an evolved node (eNodeB) base station, the eNodeB base station comprising the at least one processor and the machine-readable medium.

10. The system according to claim 8, wherein the operations further comprise maintaining a predetermined amount of bandwidth for transmission of data packets from the server to the UE.

11. The system according to claim 8, wherein a bandwidth for transmission of data from the UE to the server includes the at least the portion and at least another portion, wherein the at least another portion of the bandwidth is available for transmission of data other than the acknowledgement from the UE to the server.

12. The system according to claim 8, wherein the operations further comprise determining at least one condition associated with the communication link communicatively coupling the server and the UE;
wherein the at least one condition includes a round trip time information for the data packet, the round trip time information includes time taken by a transmission of the data packet to the server and a transmission of an acknowledgement by the server indicative of the receipt of the data packet at the TCP layer.

13. The system according to claim 8, wherein the acknowledgement from the UE to the server indicating that the packet was received by the UE is generated based on a layer 2 acknowledgement.

14. The system according to claim 8, wherein the base station transmits to the server an acknowledgement indicating a receipt of the data packet by the UE upon receiving a confirmation that the data packet was received by the UE, the confirmation being generated by at least one of the following: a media access control (MAC) layer of the base station, a packet data convergence protocol (PDCP) layer of the base station, and a radio link control (RLC) layer.

15. A computer program product comprising a non-transitory machine-readable medium storing instructions that, when executed by at least one programmable processor, cause the at least one programmable processor to perform operations comprising:
establishing a communication link between a server in a wireless communication system and a user equipment (UE) in the wireless communication system in accordance with a transmission control protocol for transmission of a data packet between the server and the UE;
sampling the communication link during uplink transmission of the data packet from the UE to the server at a predetermined time, and determining, based on the sampling, an availability of bandwidth for uplink transmission of an acknowledgement from the UE to the server, the acknowledgement indicating receipt of the data packet by the UE, wherein a base station in the wireless communication system performs the sampling and the determining, the base station being communicatively coupled with the server and with the UE; and
adjusting a bandwidth available for uplink transmission of the acknowledgement based on the determined availability of bandwidth.

16. The computer program product according to claim 15, wherein the base station includes an evolved node (eNodeB) base station, the eNodeB base station comprising the at least one programmable processor and at least one memory;
wherein the operations further comprise maintaining a predetermined amount of bandwidth for transmission of data packets from the server to the UE.

17. The computer program product according to claim 15, wherein a bandwidth for transmission of data from the UE to the server includes the at least the portion and at least another portion, wherein the at least another portion of the bandwidth is available for transmission of data other than the acknowledgement from the UE to the server.

18. The computer program product according to claim 15, wherein the operations further comprise determining at least one condition associated with the communication link communicatively coupling the server and the UE;
wherein the at least one condition includes a round trip time information for the data packet, the round trip time information includes time taken by a transmission of the data packet to the server and a transmission of an acknowledgement by the server indicative of the receipt of the data packet at the TCP layer.

19. The computer program product according to claim 15, wherein the acknowledgement from the UE to the server indicating that the packet was received by the UE is generated based on a layer 2 acknowledgement.

20. The computer program product according to claim 15, wherein the base station to the server an acknowledgement indicating a receipt of the data packet by the UE upon receiving a confirmation that the data packet was received by the UE, the confirmation being generated by at least one of the following: a media access control (MAC) layer of the base station, a packet data convergence protocol (PDCP) layer of the base station, and a radio link control (RLC) layer.

21. The method according to claim 1, wherein the adjusting includes allocating more bandwidth for uplink transmission.

22. The method according to claim 1, wherein the server includes a server of a core network of the wireless communication system.

* * * * *